United States Patent
Singleton et al.

(10) Patent No.: US 10,331,882 B2
(45) Date of Patent: Jun. 25, 2019

(54) TRACKING AND MANAGING VIRTUAL DESKTOPS USING SIGNED TOKENS

(71) Applicant: Citrix Systems, Inc., Fort Lauderdale, FL (US)

(72) Inventors: Leo C. Singleton, Fort Lauderdale, FL (US); William T. G. Charnell, Bucks (GB); Sebastian Tomasz Amrogowicz, High Wycombe (GB); Andrew John Ogle, Bucks (GB); Sheldon Ferdinand Lachambre, London (GB)

(73) Assignee: Citrix Systems, Inc., Fort Lauderdale, FL (US)

( * ) Notice: Subject to any disclaimer, the term of this patent is extended or adjusted under 35 U.S.C. 154(b) by 345 days.

(21) Appl. No.: 15/245,564

(22) Filed: Aug. 24, 2016

(65) Prior Publication Data
US 2018/0060572 A1 Mar. 1, 2018

(51) Int. Cl.
G06F 21/55 (2013.01)
G06F 9/451 (2018.01)
(Continued)

(52) U.S. Cl.
CPC ............ *G06F 21/552* (2013.01); *G06F 9/452* (2018.02); *G06F 9/45558* (2013.01); *G06F 21/53* (2013.01); *G06F 21/64* (2013.01); *G06F 2009/4557* (2013.01); *G06F 2009/45562* (2013.01); *G06F 2009/45587* (2013.01);
(Continued)

(58) Field of Classification Search
CPC ............ G06F 21/604; G06F 17/30132; G06F 9/45558; G06F 2009/4557; G06F 2009/45587; G06F 21/55; G06F 9/451; G06F 21/53; G06F 9/455; G06F 17/30131; H04L 43/106; H04L 63/0428; H04L 67/02; H04L 67/06; H04L 67/2842; H04L 63/0807; H04L 63/083
See application file for complete search history.

(56) References Cited

U.S. PATENT DOCUMENTS 8,601,583 B1 * 12/2013 Chandrasekhar ....... G06F 21/54
726/24
2002/0099952 A1 * 7/2002 Lambert ................. G06F 21/51
726/27
(Continued)

*Primary Examiner* — Jayesh M Jhaveri
(74) *Attorney, Agent, or Firm* — Banner & Witcoff, Ltd.

(57) ABSTRACT

Methods, systems, and computer-readable media for tracking and managing virtual desktops using signed tokens are presented. In some embodiments, a server computing device may receive a first registration message from a first virtual machine. The server computing device may determine a state of the first virtual machine based on token information associated with the first registration message received from the first virtual machine. Subsequently, the server computing device may update virtual machine state information records maintained by the server computing device based on the state of the first virtual machine determined by the server computing device. The virtual machine state information records maintained by the server computing device may identify one or more tainted virtual machines and one or more untainted virtual machines. In addition, the server computing device may be configured to select virtual machines for brokered virtual desktop sessions based on the virtual machine state information records.

20 Claims, 17 Drawing Sheets

(51) Int. Cl.
*G06F 21/53* (2013.01)
*G06F 9/455* (2018.01)
*G06F 21/64* (2013.01)
*H04L 12/26* (2006.01)
*H04L 29/06* (2006.01)
*H04L 29/08* (2006.01)

(52) U.S. Cl.
CPC ........ *H04L 43/106* (2013.01); *H04L 63/0428* (2013.01); *H04L 63/083* (2013.01); *H04L 63/0807* (2013.01); *H04L 67/02* (2013.01); *H04L 67/06* (2013.01); *H04L 67/2842* (2013.01)

(56) References Cited

U.S. PATENT DOCUMENTS

| | | | | |
|---|---|---|---|---|
| 2007/0234302 | A1* | 10/2007 | Suzuki | G06F 8/61 717/126 |
| 2011/0209064 | A1* | 8/2011 | Jorgensen | G06F 9/54 715/733 |
| 2012/0266170 | A1* | 10/2012 | Zimmerman | G06F 8/63 718/1 |
| 2015/0254451 | A1* | 9/2015 | Doane | G06F 21/44 726/1 |
| 2016/0344721 | A1* | 11/2016 | Odom | G06F 9/46 |

\* cited by examiner

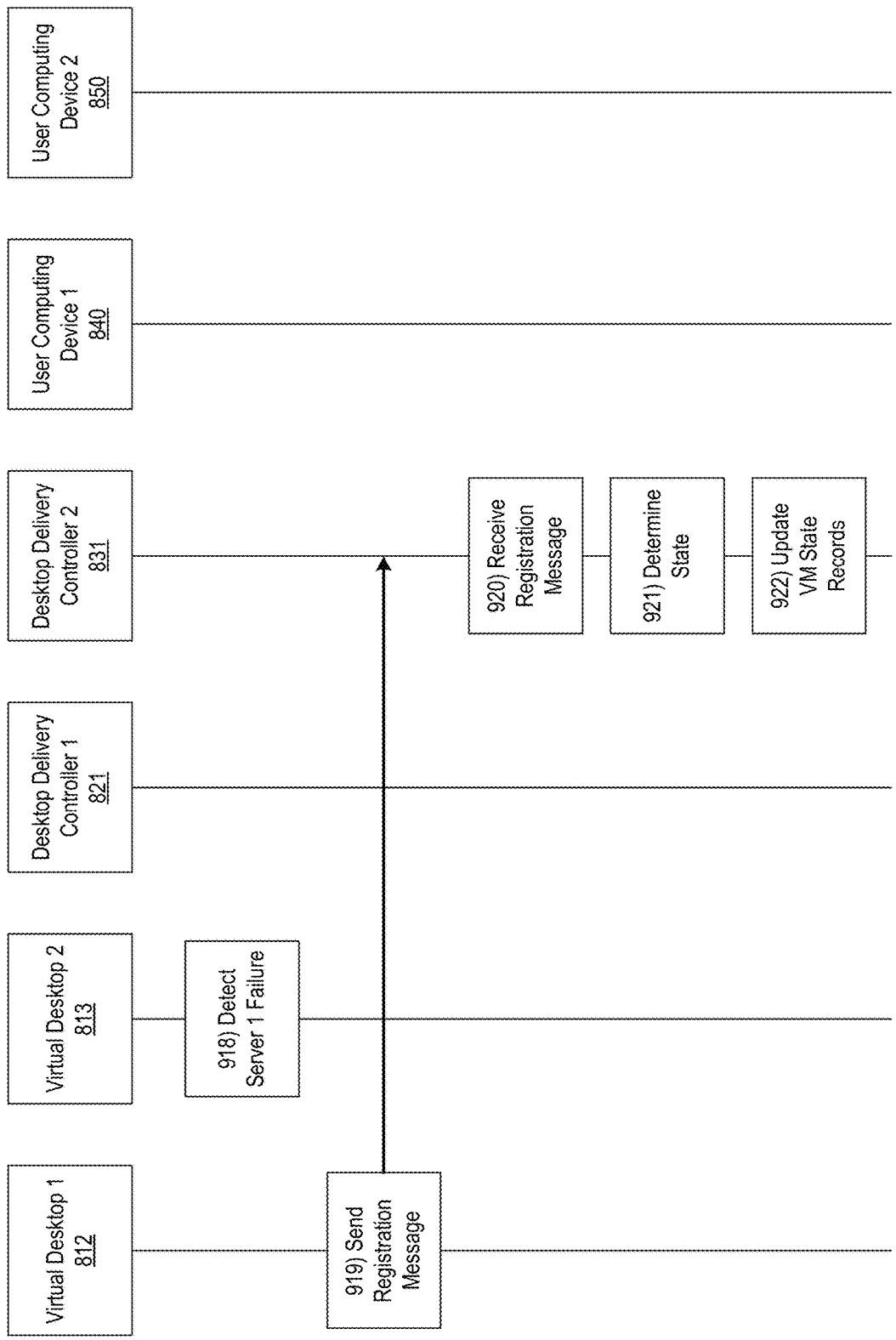

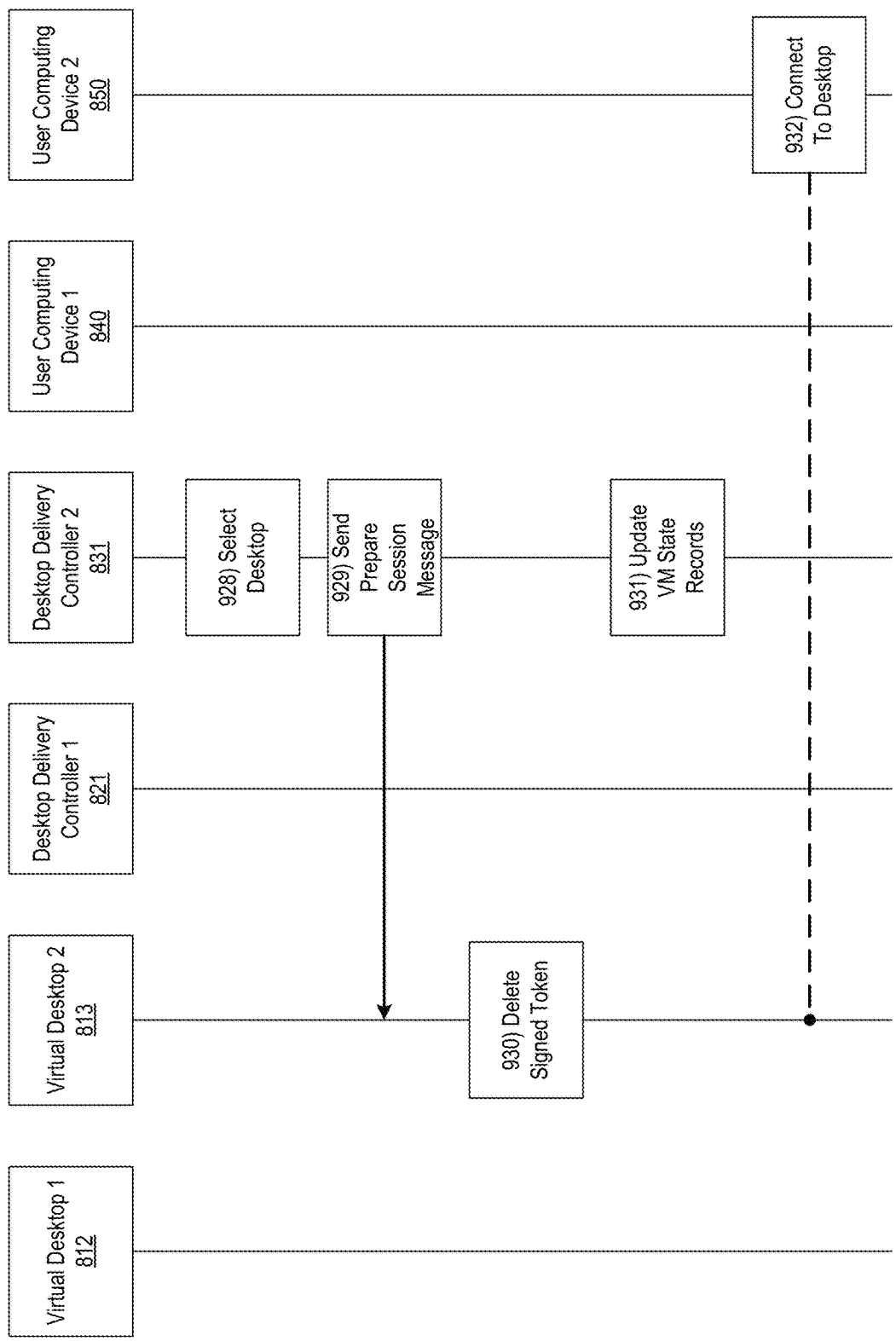

TRACKING AND MANAGING VIRTUAL DESKTOPS USING SIGNED TOKENS

FIELD

Aspects of the disclosure relate to computer hardware and software. In particular, one or more aspects of the disclosure relate to computer hardware and software for tracking and managing virtual desktops using signed tokens.

BACKGROUND

Enterprise organizations are increasingly relying on virtualization technology to provide virtual desktops to various users, including employees and other users associated with the organization. As such virtualization technology is increasingly adopted and used, it is increasingly important for organizations to control and/or otherwise manage such virtual desktops to protect the safety and security of enterprise information and other enterprise resources. In some instances, however, this may present technical challenges.

SUMMARY

Aspects of the disclosure provide technical solutions that may address and overcome one or more technical challenges associated with managing virtual desktops and protecting the safety and security of enterprise information and other enterprise resources.

For example, one or more aspects of the disclosure provide ways of tracking whether a virtual desktop has been tainted (which may, e.g., indicate that the desktop has been modified by a user of the desktop and thus needs to be reimaged), particularly in instances in which the user of the desktop is untrusted. As discussed in greater detail below, a virtual desktop may be an instance of a computer configuration that is provided to an end user by a virtual machine (which may, e.g., be executed on and/or otherwise provided by a virtualization platform). In accordance with various aspects of the disclosure, public key cryptography may be used to create one or more signed tokens for a plurality of virtual desktops, and each virtual desktop may be configured to securely delete its signed token before allowing a user to log on to the virtual desktop. In this way, a server (which may, e.g., manage the virtual desktops and/or broker user connections to the virtual desktops) may be able to determine the state of any particular desktop by obtaining and evaluating the signed token of the particular desktop. If the server is able to validate the signed token of a particular desktop using a corresponding public key, the server may determine that the particular desktop is untainted. Alternatively, if the particular desktop does not have a token or has an invalid token, the server may determine that the particular desktop is tainted and/or requires reimaging.

In accordance with one or more embodiments, a server computing device having at least one processor, a memory, and a communication interface may receive, via the communication interface, a first registration message from a first virtual machine. Subsequently, the server computing device may determine a state of the first virtual machine based on token information associated with the first registration message received from the first virtual machine. Thereafter, the server computing device may update virtual machine state information records maintained by the server computing device based on the state of the first virtual machine determined by the server computing device. The virtual machine state information records maintained by the server computing device may identify one or more tainted virtual machines and one or more untainted virtual machines. In addition, the server computing device may be configured to select virtual machines for brokered virtual desktop sessions based on the virtual machine state information records maintained by the server computing device.

In some embodiments, determining the state of the first virtual machine based on the token information associated with the first registration message received from the first virtual machine may include determining whether the first virtual machine is tainted. In some instances, determining whether the first virtual machine is tainted may include determining that the first virtual machine is not tainted based on validating a signed token included in the token information associated with the first registration message. In some instances, determining whether the first virtual machine is tainted may include determining that the first virtual machine is tainted based on failing to validate a signed token included in the token information associated with the first registration message. In some instances, determining whether the first virtual machine is tainted may include determining that the first virtual machine is tainted based on determining that the token information associated with the first registration message does not include a signed token.

In some instances, updating the virtual machine state information records maintained by the server computing device may include updating the virtual machine state information records maintained by the server computing device to mark the first virtual machine as tainted based on determining that the first virtual machine is tainted. In other instances, updating the virtual machine state information records maintained by the server computing device may include updating the virtual machine state information records maintained by the server computing device to mark the first virtual machine as untainted based on determining that the first virtual machine is not tainted.

In some embodiments, the server computing device may receive, via the communication interface, a second registration message from a second virtual machine. Subsequently, the server computing device may determine a state of the second virtual machine based on second token information associated with the second registration message received from the second virtual machine. Thereafter, the server computing device may update the virtual machine state information records maintained by the server computing device based on the state of the second virtual machine determined by the server computing device.

In some embodiments, the token information associated with the first registration message comprises a signed token associated with a disk image used to boot the first virtual machine. In some embodiments, the token information associated with the first registration message comprises a signed token provided to the first virtual machine by a second server computing device different from the server computing device during a provisioning process.

In some embodiments, a broker agent service executing on the first virtual machine may be configured to delete a signed token maintained by the first virtual machine in response to determining that the first virtual machine has been tainted. In some instances, the broker agent service executing on the first virtual machine may be configured to determine that the first virtual machine has been tainted in response to receiving a prepare session message from a desktop delivery controller. In some instances, the broker agent service executing on the first virtual machine may be configured to determine that the first virtual machine has been tainted in response to determining that the first virtual machine has initiated an unbrokered session.

In some instances, prior to sending the first registration message to the server computing device, the first virtual machine may have deleted a signed token maintained by the first virtual machine in response to receiving a prepare session message from a second server computing device different from the server computing device.

In some embodiments, the first virtual machine may be configured to send the first registration message to the server computing device in response to detecting that a second server computing device has failed.

In some embodiments, the server computing device may be configured to execute a desktop delivery controller service that connects one or more user devices with one or more virtual machines executed on a virtualization platform.

In some embodiments, the server computing device may receive, via the communication interface, a request to connect to a virtual desktop from a user device. In response to receiving the request to connect to the virtual desktop from the user device, the server computing device may select an untainted virtual machine based on the virtual machine state information records maintained by the server computing device. Subsequently, the server computing device may initiate a brokered virtual desktop session between the user device and the untainted virtual machine. In addition, in initiating the brokered virtual desktop session between the user device and the untainted virtual machine, the server computing device may send a prepare session message to the untainted virtual machine. After sending the prepare session message to the untainted virtual machine, the server computing device may connect the user device to the untainted virtual machine. In some instances, the untainted virtual machine may be configured to delete a signed token maintained on the untainted virtual machine in response to receiving the prepare session message.

These features, along with many others, are discussed in greater detail below.

BRIEF DESCRIPTION OF THE DRAWINGS

A more complete understanding of aspects described herein and the advantages thereof may be acquired by referring to the following description in consideration of the accompanying drawings, in which like reference numbers indicate like features, and in which:

FIGS. 9A-9F depict an example event sequence for tracking and managing virtual desktops using signed tokens in accordance with one or more illustrative aspects described herein.

DETAILED DESCRIPTION

In the following description of the various embodiments, reference is made to the accompanying drawings identified above and which form a part hereof, and in which is shown by way of illustration various embodiments in which aspects described herein may be practiced. It is to be understood that other embodiments may be utilized and structural and functional modifications may be made without departing from the scope described herein. Various aspects are capable of other embodiments and of being practiced or being carried out in various different ways.

It is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. The use of the terms "mounted," "connected," "coupled," "positioned," "engaged" and similar terms, is meant to include both direct and indirect mounting, connecting, coupling, positioning and engaging.

Computing Architecture

Figure 1:
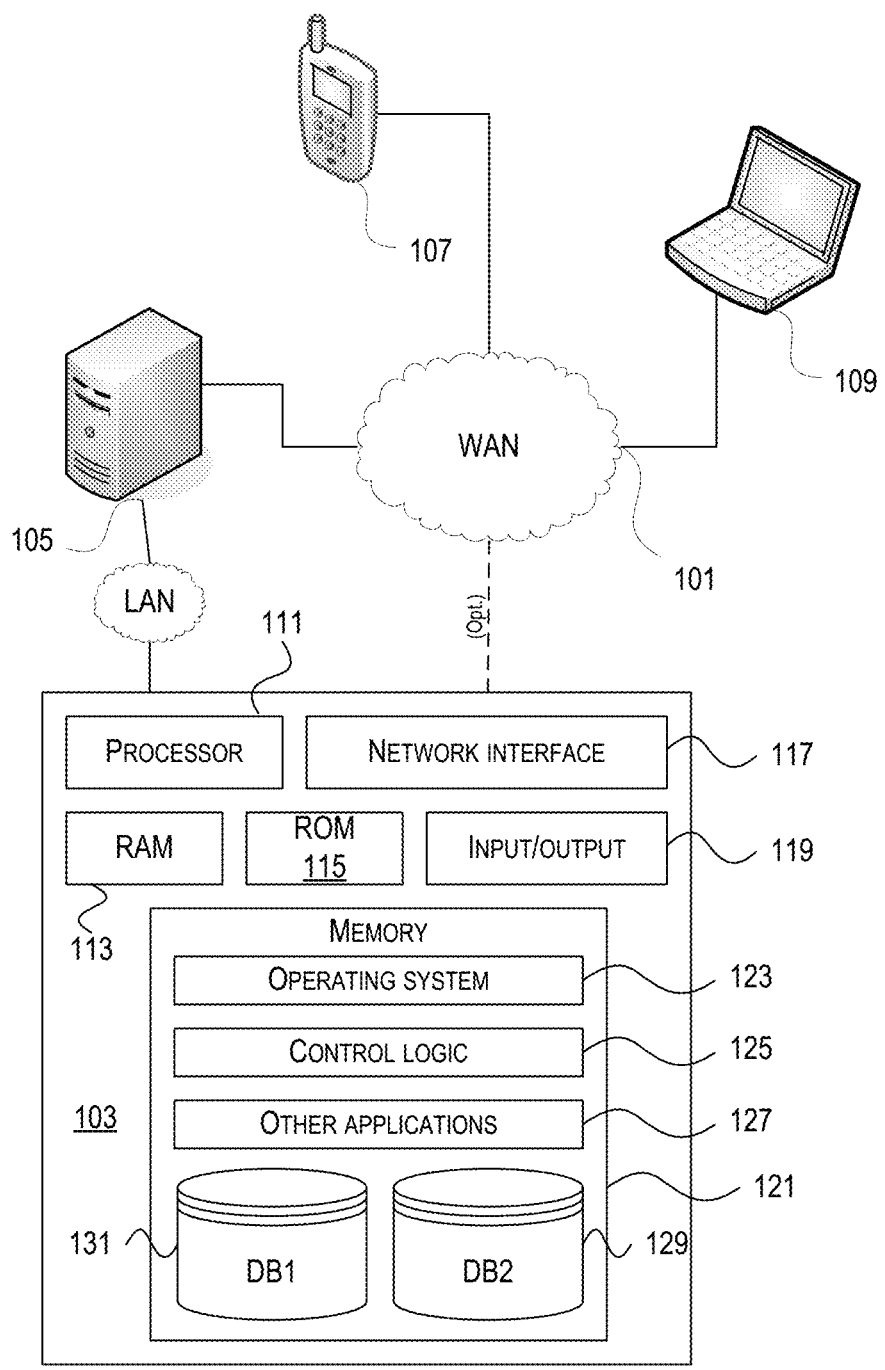
FIG. 1 depicts an illustrative computer system architecture that may be used in accordance with one or more illustrative aspects described herein.

Computer software, hardware, and networks may be utilized in a variety of different system environments, including standalone, networked, remote-access (aka, remote desktop), virtualized, and/or cloud-based environments, among others. FIG. 1 illustrates one example of a system architecture and data processing device that may be used to implement one or more illustrative aspects described herein in a standalone and/or networked environment. Various network nodes 103, 105, 107, and 109 may be interconnected via a wide area network (WAN) 101, such as the Internet. Other networks may also or alternatively be used, including private intranets, corporate networks, local area networks (LAN), metropolitan area networks (MAN), wireless networks, personal networks (PAN), and the like. Network 101 is for illustration purposes and may be replaced with fewer or additional computer networks. A local area network may have one or more of any known LAN topology and may use one or more of a variety of different protocols, such as Ethernet. Devices 103, 105, 107, 109 and other devices (not shown) may be connected to one or more of the networks via twisted pair wires, coaxial cable, fiber optics, radio waves or other communication media.

The term "network" as used herein and depicted in the drawings refers not only to systems in which remote storage devices are coupled together via one or more communication paths, but also to stand-alone devices that may be coupled, from time to time, to such systems that have storage capability. Consequently, the term "network" includes not only a "physical network" but also a "content network," which is comprised of the data—attributable to a single entity—which resides across all physical networks.

The components may include data server 103, web server 105, and client computers 107, 109. Data server 103 provides overall access, control and administration of databases and control software for performing one or more illustrative aspects describe herein. Data server 103 may be connected to web server 105 through which users interact with and obtain data as requested. Alternatively, data server 103 may act as a web server itself and be directly connected to the Internet. Data server 103 may be connected to web server 105 through the network 101 (e.g., the Internet), via direct or indirect connection, or via some other network. Users may interact with the data server 103 using remote computers 107, 109, e.g., using a web browser to connect to the data server 103 via one or more externally exposed web sites hosted by web server 105. Client computers 107, 109 may be used in concert with data server 103 to access data stored therein, or may be used for other purposes. For example, from client device 107 a user may access web server 105 using an Internet browser, as is known in the art, or by executing a software application that communicates with web server 105 and/or data server 103 over a computer network (such as the Internet).

Servers and applications may be combined on the same physical machines, and retain separate virtual or logical addresses, or may reside on separate physical machines. FIG. 1 illustrates just one example of a network architecture that may be used, and those of skill in the art will appreciate that the specific network architecture and data processing devices used may vary, and are secondary to the functionality that they provide, as further described herein. For example, services provided by web server 105 and data server 103 may be combined on a single server.

Each component 103, 105, 107, 109 may be any type of known computer, server, or data processing device. Data server 103, e.g., may include a processor 111 controlling overall operation of the data server 103. Data server 103 may further include random access memory (RAM) 113, read only memory (ROM) 115, network interface 117, input/output interfaces 119 (e.g., keyboard, mouse, display, printer, etc.), and memory 121. Input/output (I/O) 119 may include a variety of interface units and drives for reading, writing, displaying, and/or printing data or files. Memory 121 may further store operating system software 123 for controlling overall operation of the data processing device 103, control logic 125 for instructing data server 103 to perform aspects described herein, and other application software 127 providing secondary, support, and/or other functionality which may or might not be used in conjunction with aspects described herein. The control logic may also be referred to herein as the data server software 125. Functionality of the data server software may refer to operations or decisions made automatically based on rules coded into the control logic, made manually by a user providing input into the system, and/or a combination of automatic processing based on user input (e.g., queries, data updates, etc.).

Memory 121 may also store data used in performance of one or more aspects described herein, including a first database 129 and a second database 131. In some embodiments, the first database may include the second database (e.g., as a separate table, report, etc.). That is, the information can be stored in a single database, or separated into different logical, virtual, or physical databases, depending on system design. Devices 105, 107, 109 may have similar or different architecture as described with respect to device 103. Those of skill in the art will appreciate that the functionality of data processing device 103 (or device 105, 107, 109) as described herein may be spread across multiple data processing devices, for example, to distribute processing load across multiple computers, to segregate transactions based on geographic location, user access level, quality of service (QoS), etc.

One or more aspects may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HyperText Markup Language (HTML) or Extensible Markup Language (XML). The computer executable instructions may be stored on a computer readable medium such as a nonvolatile storage device. Any suitable computer readable storage media may be utilized, including hard disks, CD-ROMs, optical storage devices, magnetic storage devices, and/or any combination thereof. In addition, various transmission (non-storage) media representing data or events as described herein may be transferred between a source and a destination in the form of electromagnetic waves traveling through signal-conducting media such as metal wires, optical fibers, and/or wireless transmission media (e.g., air and/or space). Various aspects described herein may be embodied as a method, a data processing system, or a computer program product. Therefore, various functionalities may be embodied in whole or in part in software, firmware and/or hardware or hardware equivalents such as integrated circuits, field programmable gate arrays (FPGA), and the like. Particular data structures may be used to more effectively implement one or more aspects described herein, and such data structures are contemplated within the scope of computer executable instructions and computer-usable data described herein.

Figure 2:
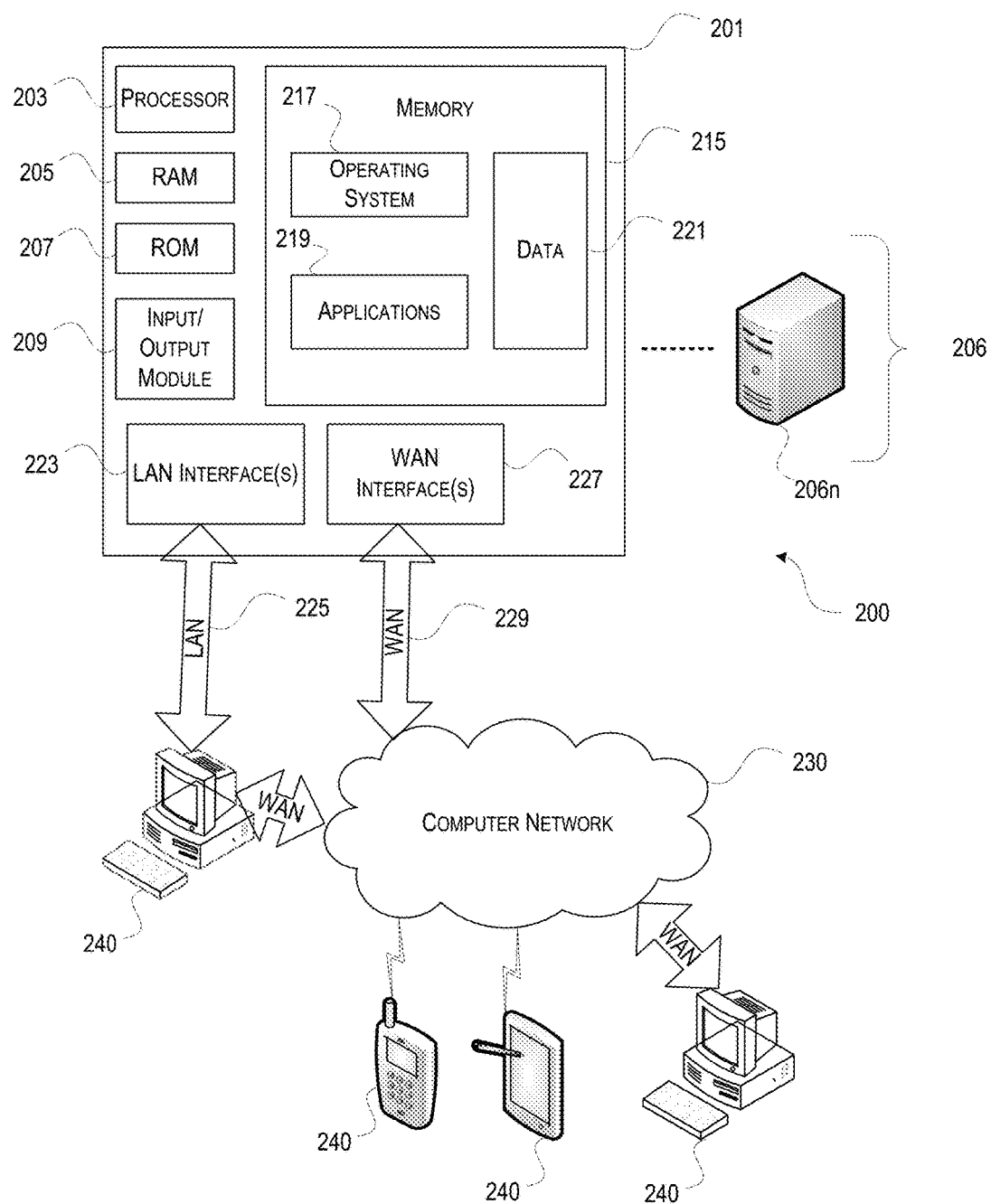
FIG. 2 depicts an illustrative remote-access system architecture that may be used in accordance with one or more illustrative aspects described herein.

With further reference to FIG. 2, one or more aspects described herein may be implemented in a remote-access environment. FIG. 2 depicts an example system architecture including a computing device 201 in an illustrative computing environment 200 that may be used according to one or more illustrative aspects described herein. Computing device 201 may be used as a server 206a in a single-server or multi-server desktop virtualization system (e.g., a remote access or cloud system) configured to provide virtual machines for client access devices. The computing device 201 may have a processor 203 for controlling overall operation of the server and its associated components, including RAM 205, ROM 207, I/O module 209, and memory 215.

I/O module 209 may include a mouse, keypad, touch screen, scanner, optical reader, and/or stylus (or other input device(s)) through which a user of computing device 201 may provide input, and may also include one or more of a speaker for providing audio output and a video display device for providing textual, audiovisual, and/or graphical output. Software may be stored within memory 215 and/or other storage to provide instructions to processor 203 for configuring computing device 201 into a special purpose computing device in order to perform various functions as described herein. For example, memory 215 may store software used by the computing device 201, such as an operating system 217, application programs 219, and an associated database 221.

Computing device 201 may operate in a networked environment supporting connections to one or more remote computers, such as terminals 240 (also referred to as client devices). The terminals 240 may be personal computers, mobile devices, laptop computers, tablets, or servers that include many or all of the elements described above with respect to the computing device 103 or 201. The network connections depicted in FIG. 2 include a local area network (LAN) 225 and a wide area network (WAN) 229, but may also include other networks. When used in a LAN networking environment, computing device 201 may be connected to the LAN 225 through a network interface or adapter 223. When used in a WAN networking environment, computing device 201 may include a modem 227 or other wide area network interface for establishing communications over the WAN 229, such as computer network 230 (e.g., the Internet). It will be appreciated that the network connections shown are illustrative and other means of establishing a communications link between the computers may be used. Computing device 201 and/or terminals 240 may also be mobile terminals (e.g., mobile phones, smartphones, personal digital assistants (PDAs), notebooks, etc.) including various other components, such as a battery, speaker, and antennas (not shown).

Aspects described herein may also be operational with numerous other general purpose or special purpose computing system environments or configurations. Examples of other computing systems, environments, and/or configurations that may be suitable for use with aspects described herein include, but are not limited to, personal computers, server computers, hand-held or laptop devices, multiprocessor systems, microprocessor-based systems, set top boxes, programmable consumer electronics, network personal computers (PCs), minicomputers, mainframe computers, distributed computing environments that include any of the above systems or devices, and the like.

As shown in FIG. 2, one or more client devices 240 may be in communication with one or more servers 206a-206n (generally referred to herein as "server(s) 206"). In some instances, the computing environment 200 may include a network appliance installed between the server(s) 206 and client machine(s) 240. The network appliance may manage client/server connections, and in some cases can load balance client connections amongst a plurality of backend servers 206.

The client machine(s) 240 may in some embodiments be referred to as a single client machine 240 or a single group of client machines 240, while server(s) 206 may be referred to as a single server 206 or a single group of servers 206. In one embodiment a single client machine 240 communicates with more than one server 206, while in another embodiment a single server 206 communicates with more than one client machine 240. In yet another embodiment, a single client machine 240 communicates with a single server 206.

A client machine 240 can, in some embodiments, be referenced by any one of the following non-exhaustive terms: client machine(s); client(s); client computer(s); client device(s); client computing device(s); local machine; remote machine; client node(s); endpoint(s); or endpoint node(s). The server 206, in some embodiments, may be referenced by any one of the following non-exhaustive terms: server(s), local machine; remote machine; server farm(s), or host computing device(s).

In one embodiment, the client machine 240 may be a virtual machine. The virtual machine may be any virtual machine, while in some embodiments the virtual machine may be any virtual machine managed by a Type 1 or Type 2 hypervisor, for example, a hypervisor developed by Citrix Systems, IBM, VMware, or any other hypervisor. In some aspects, the virtual machine may be managed by a hypervisor, while in aspects the virtual machine may be managed by a hypervisor executing on a server 206 or a hypervisor executing on a client 240.

Some embodiments include a client device 240 that displays application output generated by an application remotely executing on a server 206 or other remotely located machine. In these embodiments, the client device 240 may execute a virtual machine receiver program or application to display the output in an application window, a browser, or other output window. In one example, the application is a desktop, while in other examples the application is an application that generates or presents a desktop. A desktop may include a graphical shell providing a user interface for an instance of an operating system in which local and/or remote applications can be integrated. Applications, as used herein, are programs that execute after an instance of an operating system (and, optionally, also the desktop) has been loaded.

The server 206, in some embodiments, uses a remote presentation protocol or other program to send data to a thin-client or remote-display application executing on the client to present display output generated by an application executing on the server 206. The thin-client or remote-display protocol can be any one of the following non-exhaustive list of protocols: the Independent Computing Architecture (ICA) protocol developed by Citrix Systems, Inc. of Ft. Lauderdale, Fla.; or the Remote Desktop Protocol (RDP) manufactured by the Microsoft Corporation of Redmond, Wash.

A remote computing environment may include more than one server 206a-206n such that the servers 206a-206n are logically grouped together into a server farm 206, for example, in a cloud computing environment. The server farm 206 may include servers 206 that are geographically dispersed while and logically grouped together, or servers 206 that are located proximate to each other while logically grouped together. Geographically dispersed servers 206a-206n within a server farm 206 can, in some embodiments, communicate using a WAN (wide), MAN (metropolitan), or LAN (local), where different geographic regions can be characterized as: different continents; different regions of a continent; different countries; different states; different cities; different campuses; different rooms; or any combination of the preceding geographical locations. In some embodiments the server farm 206 may be administered as a single entity, while in other embodiments the server farm 206 can include multiple server farms.

In some embodiments, a server farm may include servers 206 that execute a substantially similar type of operating system platform (e.g., WINDOWS, UNIX, LINUX, iOS, ANDROID, SYMBIAN, etc.) In other embodiments, server farm 206 may include a first group of one or more servers that execute a first type of operating system platform, and a second group of one or more servers that execute a second type of operating system platform.

Server 206 may be configured as any type of server, as needed, e.g., a file server, an application server, a web server, a proxy server, an appliance, a network appliance, a gateway, an application gateway, a gateway server, a virtualization server, a deployment server, a Secure Sockets Layer (SSL) VPN server, a firewall, a web server, an application server or as a master application server, a server executing an active directory, or a server executing an application acceleration program that provides firewall functionality, application functionality, or load balancing functionality. Other server types may also be used.

Some embodiments include a first server 206a that receives requests from a client machine 240, forwards the request to a second server 206b, and responds to the request generated by the client machine 240 with a response from the second server 206b. First server 206a may acquire an enumeration of applications available to the client machine 240 and well as address information associated with an application server 206 hosting an application identified within the enumeration of applications. First server 206a can then present a response to the client's request using a web interface, and communicate directly with the client 240 to provide the client 240 with access to an identified application. One or more clients 240 and/or one or more servers 206 may transmit data over network 230, e.g., network 101.

Figure 3:
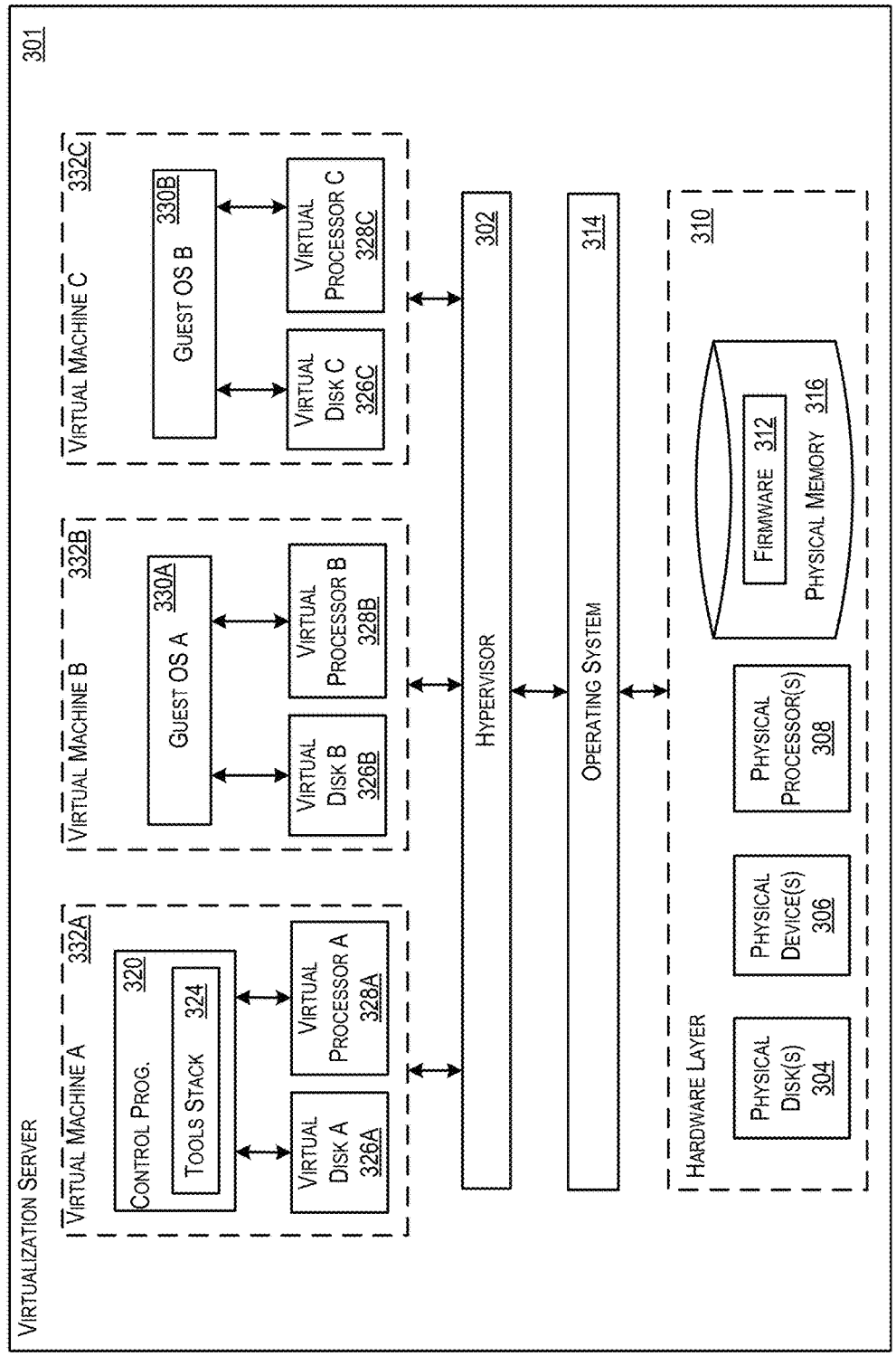
FIG. 3 depicts an illustrative virtualized (hypervisor) system architecture that may be used in accordance with one or more illustrative aspects described herein.

FIG. 3 shows a high-level architecture of an illustrative desktop virtualization system. As shown, the desktop virtualization system may be single-server or multi-server system, or cloud system, including at least one virtualization server 301 configured to provide virtual desktops and/or virtual applications to one or more client access devices 240. As used herein, a desktop refers to a graphical environment or space in which one or more applications may be hosted and/or executed. A desktop may include a graphical shell providing a user interface for an instance of an operating system in which local and/or remote applications can be integrated. Applications may include programs that execute after an instance of an operating system (and, optionally, also the desktop) has been loaded. Each instance of the operating system may be physical (e.g., one operating system per device) or virtual (e.g., many instances of an OS running on a single device). Each application may be executed on a local device, or executed on a remotely located device (e.g., remoted).

A computer device 301 may be configured as a virtualization server in a virtualization environment, for example, a single-server, multi-server, or cloud computing environment. Virtualization server 301 illustrated in FIG. 3 can be deployed as and/or implemented by one or more embodiments of the server 206 illustrated in FIG. 2 or by other known computing devices. Included in virtualization server 301 is a hardware layer that can include one or more physical disks 304, one or more physical devices 306, one or more physical processors 308 and one or more physical memories 316. In some embodiments, firmware 312 can be stored within a memory element in the physical memory 316 and can be executed by one or more of the physical processors 308. Virtualization server 301 may further include an operating system 314 that may be stored in a memory element in the physical memory 316 and executed by one or more of the physical processors 308. Still further, a hypervisor 302 may be stored in a memory element in the physical memory 316 and can be executed by one or more of the physical processors 308.

Executing on one or more of the physical processors 308 may be one or more virtual machines 332A-C (generally 332). Each virtual machine 332 may have a virtual disk 326A-C and a virtual processor 328A-C. In some embodiments, a first virtual machine 332A may execute, using a virtual processor 328A, a control program 320 that includes a tools stack 324. Control program 320 may be referred to as a control virtual machine, Dom0, Domain 0, or other virtual machine used for system administration and/or control. In some embodiments, one or more virtual machines 332B-C can execute, using a virtual processor 328B-C, a guest operating system 330A-B.

Virtualization server 301 may include a hardware layer 310 with one or more pieces of hardware that communicate with the virtualization server 301. In some embodiments, the hardware layer 310 can include one or more physical disks 304, one or more physical devices 306, one or more physical processors 308, and one or more memory 216. Physical components 304, 306, 308, and 316 may include, for example, any of the components described above. Physical devices 306 may include, for example, a network interface card, a video card, a keyboard, a mouse, an input device, a monitor, a display device, speakers, an optical drive, a storage device, a universal serial bus connection, a printer, a scanner, a network element (e.g., router, firewall, network address translator, load balancer, virtual private network (VPN) gateway, Dynamic Host Configuration Protocol (DHCP) router, etc.), or any device connected to or communicating with virtualization server 301. Physical memory 316 in the hardware layer 310 may include any type of memory. Physical memory 316 may store data, and in some embodiments may store one or more programs, or set of executable instructions. FIG. 3 illustrates an embodiment where firmware 312 is stored within the physical memory 316 of virtualization server 301. Programs or executable instructions stored in the physical memory 316 can be executed by the one or more processors 308 of virtualization server 301.

Virtualization server 301 may also include a hypervisor 302. In some embodiments, hypervisor 302 may be a program executed by processors 308 on virtualization server 301 to create and manage any number of virtual machines 332. Hypervisor 302 may be referred to as a virtual machine monitor, or platform virtualization software. In some embodiments, hypervisor 302 can be any combination of executable instructions and hardware that monitors virtual machines executing on a computing machine. Hypervisor 302 may be Type 2 hypervisor, where the hypervisor that executes within an operating system 314 executing on the virtualization server 301. Virtual machines then execute at a level above the hypervisor. In some embodiments, the Type 2 hypervisor executes within the context of a user's operating system such that the Type 2 hypervisor interacts with the user's operating system. In other embodiments, one or more virtualization servers 301 in a virtualization environment may instead include a Type 1 hypervisor (not shown). A Type 1 hypervisor may execute on the virtualization server 301 by directly accessing the hardware and resources within the hardware layer 310. That is, while a Type 2 hypervisor 302 accesses system resources through a host operating system 314, as shown, a Type 1 hypervisor may directly access all system resources without the host operating system 314. A Type 1 hypervisor may execute directly on one or more physical processors 308 of virtualization server 301, and may include program data stored in the physical memory 316.

Hypervisor 302, in some embodiments, can provide virtual resources to operating systems 330 or control programs 320 executing on virtual machines 332 in any manner that simulates the operating systems 330 or control programs 320 having direct access to system resources. System resources can include, but are not limited to, physical devices 306, physical disks 304, physical processors 308, physical memory 316 and any other component included in virtualization server 301 hardware layer 310. Hypervisor 302 may be used to emulate virtual hardware, partition physical hardware, virtualize physical hardware, and/or execute virtual machines that provide access to computing environments. In still other embodiments, hypervisor 302 controls processor scheduling and memory partitioning for a virtual machine 332 executing on virtualization server 301. Hypervisor 302 may include those manufactured by VMWare, Inc., of Palo Alto, Calif.; the XENPROJECT hypervisor, an open source product whose development is overseen by the open source XenProject.org community; HyperV, VirtualServer or virtual PC hypervisors provided by Microsoft, or others. In some embodiments, virtualization server 301 executes a hypervisor 302 that creates a virtual machine platform on which guest operating systems may execute. In these embodiments, the virtualization server 301 may be referred to as a host server. An example of such a virtualization server is the XENSERVER provided by Citrix Systems, Inc., of Fort Lauderdale, Fla.

Hypervisor 302 may create one or more virtual machines 332B-C (generally 332) in which guest operating systems 330 execute. In some embodiments, hypervisor 302 may load a virtual machine image to create a virtual machine 332. In other embodiments, the hypervisor 302 may executes a guest operating system 330 within virtual machine 332. In still other embodiments, virtual machine 332 may execute guest operating system 330.

In addition to creating virtual machines 332, hypervisor 302 may control the execution of at least one virtual machine 332. In other embodiments, hypervisor 302 may presents at least one virtual machine 332 with an abstraction of at least one hardware resource provided by the virtualization server 301 (e.g., any hardware resource available within the hardware layer 310). In other embodiments, hypervisor 302 may control the manner in which virtual machines 332 access physical processors 308 available in virtualization server 301. Controlling access to physical processors 308 may include determining whether a virtual machine 332 should have access to a processor 308, and how physical processor capabilities are presented to the virtual machine 332.

As shown in FIG. 3, virtualization server 301 may host or execute one or more virtual machines 332. A virtual machine 332 is a set of executable instructions that, when executed by a processor 308, imitate the operation of a physical computer such that the virtual machine 332 can execute programs and processes much like a physical computing device. While FIG. 3 illustrates an embodiment where a virtualization server 301 hosts three virtual machines 332, in other embodiments virtualization server 301 can host any number of virtual machines 332. Hypervisor 302, in some embodiments, provides each virtual machine 332 with a unique virtual view of the physical hardware, memory, processor and other system resources available to that virtual machine 332. In some embodiments, the unique virtual view can be based on one or more of virtual machine permissions, application of a policy engine to one or more virtual machine identifiers, a user accessing a virtual machine, the applications executing on a virtual machine, networks accessed by a virtual machine, or any other desired criteria. For instance, hypervisor 302 may create one or more unsecure virtual machines 332 and one or more secure virtual machines 332. Unsecure virtual machines 332 may be prevented from accessing resources, hardware, memory locations, and programs that secure virtual machines 332 may be permitted to access. In other embodiments, hypervisor 302 may provide each virtual machine 332 with a substantially similar virtual view of the physical hardware, memory, processor and other system resources available to the virtual machines 332.

Each virtual machine 332 may include a virtual disk 326A-C (generally 326) and a virtual processor 328A-C (generally 328.) The virtual disk 326, in some embodiments, is a virtualized view of one or more physical disks 304 of the virtualization server 301, or a portion of one or more physical disks 304 of the virtualization server 301. The virtualized view of the physical disks 304 can be generated, provided and managed by the hypervisor 302. In some embodiments, hypervisor 302 provides each virtual machine 332 with a unique view of the physical disks 304. Thus, in these embodiments, the particular virtual disk 326 included in each virtual machine 332 can be unique when compared with the other virtual disks 326.

A virtual processor 328 can be a virtualized view of one or more physical processors 308 of the virtualization server 301. In some embodiments, the virtualized view of the physical processors 308 can be generated, provided and managed by hypervisor 302. In some embodiments, virtual processor 328 has substantially all of the same characteristics of at least one physical processor 308. In other embodiments, virtual processor 308 provides a modified view of physical processors 308 such that at least some of the characteristics of the virtual processor 328 are different than the characteristics of the corresponding physical processor 308.

Figure 4:
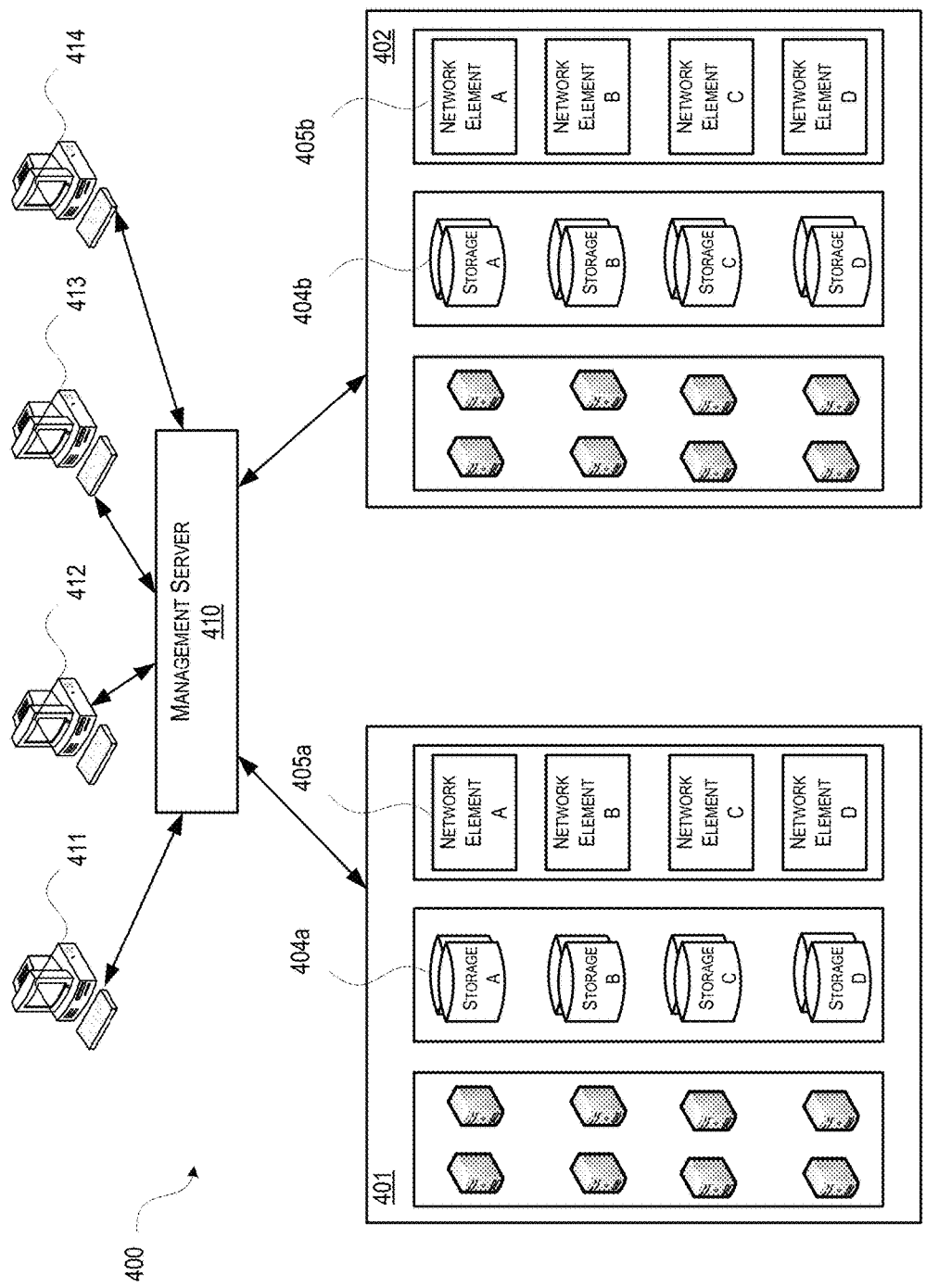
FIG. 4 depicts an illustrative cloud-based system architecture that may be used in accordance with one or more illustrative aspects described herein.

With further reference to FIG. 4, some aspects described herein may be implemented in a cloud-based environment. FIG. 4 illustrates an example of a cloud computing environment (or cloud system) 400. As seen in FIG. 4, client computers 411-414 may communicate with a cloud management server 410 to access the computing resources (e.g., host servers 403, storage resources 404, and network resources 405) of the cloud system.

Management server 410 may be implemented on one or more physical servers. The management server 410 may run, for example, CLOUDPLATFORM by Citrix Systems, Inc. of Ft. Lauderdale, Fla., or OPENSTACK, among others. Management server 410 may manage various computing resources, including cloud hardware and software resources, for example, host computers 403, data storage devices 404, and networking devices 405. The cloud hardware and software resources may include private and/or public components. For example, a cloud may be configured as a private cloud to be used by one or more particular customers or client computers 411-414 and/or over a private network. In other embodiments, public clouds or hybrid public-private clouds may be used by other customers over an open or hybrid networks.

Management server 410 may be configured to provide user interfaces through which cloud operators and cloud customers may interact with the cloud system. For example, the management server 410 may provide a set of application programming interfaces (APIs) and/or one or more cloud operator console applications (e.g., web-based on standalone applications) with user interfaces to allow cloud operators to manage the cloud resources, configure the virtualization layer, manage customer accounts, and perform other cloud administration tasks. The management server 410 also may include a set of APIs and/or one or more customer console applications with user interfaces configured to receive cloud computing requests from end users via client computers 411-414, for example, requests to create, modify, or destroy virtual machines within the cloud. Client computers 411-414 may connect to management server 410 via the Internet or other communication network, and may request access to one or more of the computing resources managed by management server 410. In response to client requests, the management server 410 may include a resource manager configured to select and provision physical resources in the hardware layer of the cloud system based on the client requests. For example, the management server 410 and additional components of the cloud system may be configured to provision, create, and manage virtual machines and their operating environments (e.g., hypervisors, storage resources, services offered by the network elements, etc.) for customers at client computers 411-414, over a network (e.g., the Internet), providing customers with computational resources, data storage services, networking capabilities, and computer platform and application support. Cloud systems also may be configured to provide various specific services, including security systems, development environments, user interfaces, and the like.

Certain clients 411-414 may be related, for example, different client computers creating virtual machines on behalf of the same end user, or different users affiliated with the same company or organization. In other examples, certain clients 411-414 may be unrelated, such as users affiliated with different companies or organizations. For unrelated clients, information on the virtual machines or storage of any one user may be hidden from other users.

Referring now to the physical hardware layer of a cloud computing environment, availability zones 401-402 (or zones) may refer to a collocated set of physical computing resources. Zones may be geographically separated from other zones in the overall cloud of computing resources. For example, zone 401 may be a first cloud datacenter located in California, and zone 402 may be a second cloud datacenter located in Florida. Management sever 410 may be located at one of the availability zones, or at a separate location. Each zone may include an internal network that interfaces with devices that are outside of the zone, such as the management server 410, through a gateway. End users of the cloud (e.g., clients 411-414) might or might not be aware of the distinctions between zones. For example, an end user may request the creation of a virtual machine having a specified amount of memory, processing power, and network capabilities. The management server 410 may respond to the user's request and may allocate the resources to create the virtual machine without the user knowing whether the virtual machine was created using resources from zone 401 or zone 402. In other examples, the cloud system may allow end users to request that virtual machines (or other cloud resources) are allocated in a specific zone or on specific resources 403-405 within a zone.

In this example, each zone 401-402 may include an arrangement of various physical hardware components (or computing resources) 403-405, for example, physical hosting resources (or processing resources), physical network resources, physical storage resources, switches, and additional hardware resources that may be used to provide cloud computing services to customers. The physical hosting resources in a cloud zone 401-402 may include one or more computer servers 403, such as the virtualization servers 301 described above, which may be configured to create and host virtual machine instances. The physical network resources in a cloud zone 401 or 402 may include one or more network elements 405 (e.g., network service providers) comprising hardware and/or software configured to provide a network service to cloud customers, such as firewalls, network address translators, load balancers, virtual private network (VPN) gateways, Dynamic Host Configuration Protocol (DHCP) routers, and the like. The storage resources in the cloud zone 401-402 may include storage disks (e.g., solid state drives (SSDs), magnetic hard disks, etc.) and other storage devices.

The example cloud computing environment shown in FIG. 4 also may include a virtualization layer (e.g., as shown in FIGS. 1-3) with additional hardware and/or software resources configured to create and manage virtual machines and provide other services to customers using the physical resources in the cloud. The virtualization layer may include hypervisors, as described above in FIG. 3, along with other components to provide network virtualizations, storage virtualizations, etc. The virtualization layer may be as a separate layer from the physical resource layer, or may share some or all of the same hardware and/or software resources with the physical resource layer. For example, the virtualization layer may include a hypervisor installed in each of the virtualization servers 403 with the physical computing resources. Known cloud systems may alternatively be used, e.g., WINDOWS AZURE (Microsoft Corporation of Redmond Wash.), AMAZON EC2 (Amazon.com Inc. of Seattle, Wash.), IBM BLUE CLOUD (IBM Corporation of Armonk, N.Y.), or others.

Enterprise Mobility Management Architecture

Figure 5:
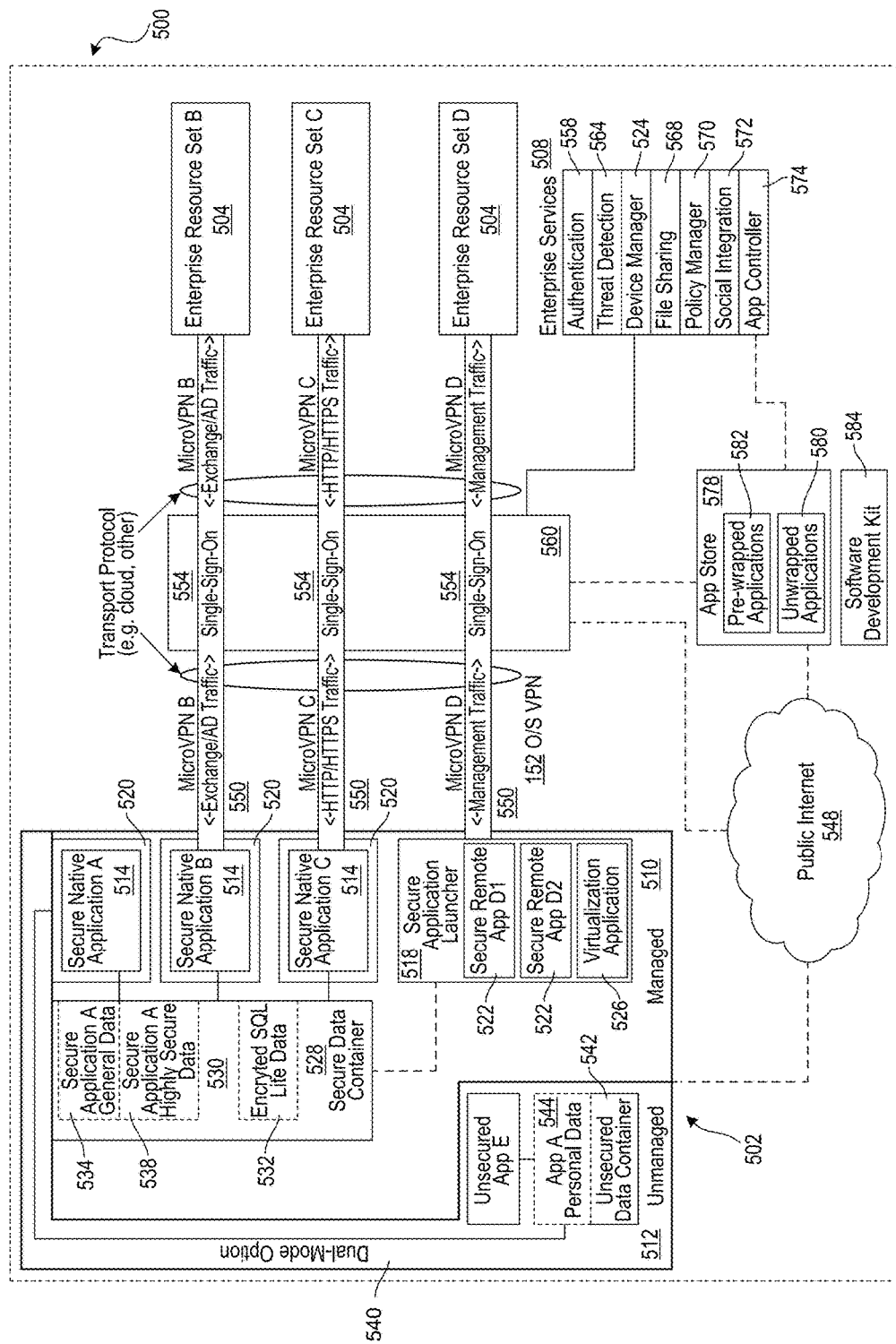
FIG. 5 depicts an illustrative enterprise mobility management system in accordance with one or more illustrative aspects described herein.

FIG. 5 represents an enterprise mobility technical architecture 500 for use in a BYOD environment. The architecture enables a user of a mobile device 502 to both access enterprise or personal resources from a mobile device 502 and use the mobile device 502 for personal use. The user may access such enterprise resources 504 or enterprise services 508 using a mobile device 502 that is purchased by the user or a mobile device 502 that is provided by the enterprise to user. The user may utilize the mobile device 502 for business use only or for business and personal use. The mobile device may run an iOS operating system, and Android operating system, or the like. The enterprise may choose to implement policies to manage the mobile device 504. The policies may be implanted through a firewall or gateway in such a way that the mobile device may be identified, secured or security verified, and provided selective or full access to the enterprise resources. The policies may be mobile device management policies, mobile application management policies, mobile data management policies, or some combination of mobile device, application, and data management policies. A mobile device 504 that is managed through the application of mobile device management policies may be referred to as an enrolled device.

In some embodiments, the operating system of the mobile device may be separated into a managed partition 510 and an unmanaged partition 512. The managed partition 510 may have policies applied to it to secure the applications running on and data stored in the managed partition. The applications running on the managed partition may be secure applications. In other embodiments, all applications may execute in accordance with a set of one or more policy files received separate from the application, and which define one or more security parameters, features, resource restrictions, and/or other access controls that are enforced by the mobile device management system when that application is executing on the device. By operating in accordance with their respective policy file(s), each application may be allowed or restricted from communications with one or more other applications and/or resources, thereby creating a virtual partition. Thus, as used herein, a partition may refer to a physically partitioned portion of memory (physical partition), a logically partitioned portion of memory (logical partition), and/or a virtual partition created as a result of enforcement of one or more policies and/or policy files across multiple apps as described herein (virtual partition). Stated differently, by enforcing policies on managed apps, those apps may be restricted to only be able to communicate with other managed apps and trusted enterprise resources, thereby creating a virtual partition that is impenetrable by unmanaged apps and devices.

The secure applications may be email applications, web browsing applications, software-as-a-service (SaaS) access applications, Windows Application access applications, and the like. The secure applications may be secure native applications 514, secure remote applications 522 executed by a secure application launcher 518, virtualization applications 526 executed by a secure application launcher 518, and the like. The secure native applications 514 may be wrapped by a secure application wrapper 520. The secure application wrapper 520 may include integrated policies that are executed on the mobile device 502 when the secure native application is executed on the device. The secure application wrapper 520 may include meta-data that points the secure native application 514 running on the mobile device 502 to the resources hosted at the enterprise that the secure native application 514 may require to complete the task requested upon execution of the secure native application 514. The secure remote applications 522 executed by a secure application launcher 518 may be executed within the secure application launcher application 518. The virtualization applications 526 executed by a secure application launcher 518 may utilize resources on the mobile device 502, at the enterprise resources 504, and the like. The resources used on the mobile device 502 by the virtualization applications 526 executed by a secure application launcher 518 may include user interaction resources, processing resources, and the like. The user interaction resources may be used to collect and transmit keyboard input, mouse input, camera input, tactile input, audio input, visual input, gesture input, and the like. The processing resources may be used to present a user interface, process data received from the enterprise resources 504, and the like. The resources used at the enterprise resources 504 by the virtualization applications 526 executed by a secure application launcher 518 may include user interface generation resources, processing resources, and the like. The user interface generation resources may be used to assemble a user interface, modify a user interface, refresh a user interface, and the like. The processing resources may be used to create information, read information, update information, delete information, and the like. For example, the virtualization application may record user interactions associated with a graphical user interface (GUI) and communicate them to a server application where the server application will use the user interaction data as an input to the application operating on the server. In this arrangement, an enterprise may elect to maintain the application on the server side as well as data, files, etc. associated with the application. While an enterprise may elect to "mobilize" some applications in accordance with the principles herein by securing them for deployment on the mobile device, this arrangement may also be elected for certain applications. For example, while some applications may be secured for use on the mobile device, others might not be prepared or appropriate for deployment on the mobile device so the enterprise may elect to provide the mobile user access to the unprepared applications through virtualization techniques. As another example, the enterprise may have large complex applications with large and complex data sets (e.g., material resource planning applications) where it would be very difficult, or otherwise undesirable, to customize the application for the mobile device so the enterprise may elect to provide access to the application through virtualization techniques. As yet another example, the enterprise may have an application that maintains highly secured data (e.g., human resources data, customer data, engineering data) that may be deemed by the enterprise as too sensitive for even the secured mobile environment so the enterprise may elect to use virtualization techniques to permit mobile access to such applications and data. An enterprise may elect to provide both fully secured and fully functional applications on the mobile device as well as a virtualization application to allow access to applications that are deemed more properly operated on the server side. In an embodiment, the virtualization application may store some data, files, etc. on the mobile phone in one of the secure storage locations. An enterprise, for example, may elect to allow certain information to be stored on the phone while not permitting other information.

In connection with the virtualization application, as described herein, the mobile device may have a virtualization application that is designed to present GUIs and then record user interactions with the GUI. The application may communicate the user interactions to the server side to be used by the server side application as user interactions with the application. In response, the application on the server side may transmit back to the mobile device a new GUI. For example, the new GUI may be a static page, a dynamic page, an animation, or the like, thereby providing access to remotely located resources.

The secure applications may access data stored in a secure data container 528 in the managed partition 510 of the mobile device. The data secured in the secure data container may be accessed by the secure wrapped applications 514, applications executed by a secure application launcher 522, virtualization applications 526 executed by a secure application launcher 522, and the like. The data stored in the secure data container 528 may include files, databases, and the like. The data stored in the secure data container 528 may include data restricted to a specific secure application 530, shared among secure applications 532, and the like. Data restricted to a secure application may include secure general data 534 and highly secure data 538. Secure general data may use a strong form of encryption such as Advanced Encryption Standard (AES) 128-bit encryption or the like, while highly secure data 538 may use a very strong form of encryption such as AES 256-bit encryption. Data stored in the secure data container 528 may be deleted from the device upon receipt of a command from the device manager 524. The secure applications may have a dual-mode option 540. The dual mode option 540 may present the user with an option to operate the secured application in an unsecured or unmanaged mode. In an unsecured or unmanaged mode, the secure applications may access data stored in an unsecured data container 542 on the unmanaged partition 512 of the mobile device 502. The data stored in an unsecured data container may be personal data 544. The data stored in an unsecured data container 542 may also be accessed by unsecured applications 548 that are running on the unmanaged partition 512 of the mobile device 502. The data stored in an unsecured data container 542 may remain on the mobile device 502 when the data stored in the secure data container 528 is deleted from the mobile device 502. An enterprise may want to delete from the mobile device selected or all data, files, and/or applications owned, licensed or controlled by the enterprise (enterprise data) while leaving or otherwise preserving personal data, files, and/or applications owned, licensed or controlled by the user (personal data). This operation may be referred to as a selective wipe. With the enterprise and personal data arranged in accordance to the aspects described herein, an enterprise may perform a selective wipe.

The mobile device may connect to enterprise resources 504 and enterprise services 508 at an enterprise, to the public Internet 548, and the like. The mobile device may connect to enterprise resources 504 and enterprise services 508 through virtual private network connections. The virtual private network connections, also referred to as microVPN or application-specific VPN, may be specific to particular applications 550, particular devices, particular secured areas on the mobile device, and the like 552. For example, each of the wrapped applications in the secured area of the phone may access enterprise resources through an application specific VPN such that access to the VPN would be granted based on attributes associated with the application, possibly in conjunction with user or device attribute information. The virtual private network connections may carry Microsoft Exchange traffic, Microsoft Active Directory traffic, HyperText Transfer Protocol (HTTP) traffic, HyperText Transfer Protocol Secure (HTTPS) traffic, application management traffic, and the like. The virtual private network connections may support and enable single-sign-on authentication processes 554. The single-sign-on processes may allow a user to provide a single set of authentication credentials, which are then verified by an authentication service 558. The authentication service 558 may then grant to the user access to multiple enterprise resources 504, without requiring the user to provide authentication credentials to each individual enterprise resource 504.

The virtual private network connections may be established and managed by an access gateway 560. The access gateway 560 may include performance enhancement features that manage, accelerate, and improve the delivery of enterprise resources 504 to the mobile device 502. The access gateway may also re-route traffic from the mobile device 502 to the public Internet 548, enabling the mobile device 502 to access publicly available and unsecured applications that run on the public Internet 548. The mobile device may connect to the access gateway via a transport network 562. The transport network 562 may be a wired network, wireless network, cloud network, local area network, metropolitan area network, wide area network, public network, private network, and the like.

The enterprise resources 504 may include email servers, file sharing servers, SaaS applications, Web application servers, Windows application servers, and the like. Email servers may include Exchange servers, Lotus Notes servers, and the like. File sharing servers may include ShareFile servers, and the like. SaaS applications may include Salesforce, and the like. Windows application servers may include any application server that is built to provide applications that are intended to run on a local Windows operating system, and the like. The enterprise resources 504 may be premise-based resources, cloud based resources, and the like. The enterprise resources 504 may be accessed by the mobile device 502 directly or through the access gateway 560. The enterprise resources 504 may be accessed by the mobile device 502 via a transport network 562. The transport network 562 may be a wired network, wireless network, cloud network, local area network, metropolitan area network, wide area network, public network, private network, and the like.

The enterprise services 508 may include authentication services 558, threat detection services 564, device manager services 524, file sharing services 568, policy manager services 570, social integration services 572, application controller services 574, and the like. Authentication services 558 may include user authentication services, device authentication services, application authentication services, data authentication services and the like. Authentication services 558 may use certificates. The certificates may be stored on the mobile device 502, by the enterprise resources 504, and the like. The certificates stored on the mobile device 502 may be stored in an encrypted location on the mobile device, the certificate may be temporarily stored on the mobile device 502 for use at the time of authentication, and the like. Threat detection services 564 may include intrusion detection services, unauthorized access attempt detection services, and the like. Unauthorized access attempt detection services may include unauthorized attempts to access devices, applications, data, and the like. Device management services 524 may include configuration, provisioning, security, support, monitoring, reporting, and decommissioning services. File sharing services 568 may include file management services, file storage services, file collaboration services, and the like. Policy manager services 570 may include device policy manager services, application policy manager services, data policy manager services, and the like. Social integration services 572 may include contact integration services, collaboration services, integration with social networks such as Facebook, Twitter, and LinkedIn, and the like. Application controller services 574 may include management services, provisioning services, deployment services, assignment services, revocation services, wrapping services, and the like.

The enterprise mobility technical architecture 500 may include an application store 578. The application store 578 may include unwrapped applications 580, pre-wrapped applications 582, and the like. Applications may be populated in the application store 578 from the application controller 574. The application store 578 may be accessed by the mobile device 502 through the access gateway 560, through the public Internet 548, or the like. The application store may be provided with an intuitive and easy to use User Interface.

A software development kit 584 may provide a user the capability to secure applications selected by the user by wrapping the application as described previously in this description. An application that has been wrapped using the software development kit 584 may then be made available to the mobile device 502 by populating it in the application store 578 using the application controller 574.

The enterprise mobility technical architecture 500 may include a management and analytics capability 588. The management and analytics capability 588 may provide information related to how resources are used, how often resources are used, and the like. Resources may include devices, applications, data, and the like. How resources are used may include which devices download which applications, which applications access which data, and the like. How often resources are used may include how often an application has been downloaded, how many times a specific set of data has been accessed by an application, and the like.

Figure 6:
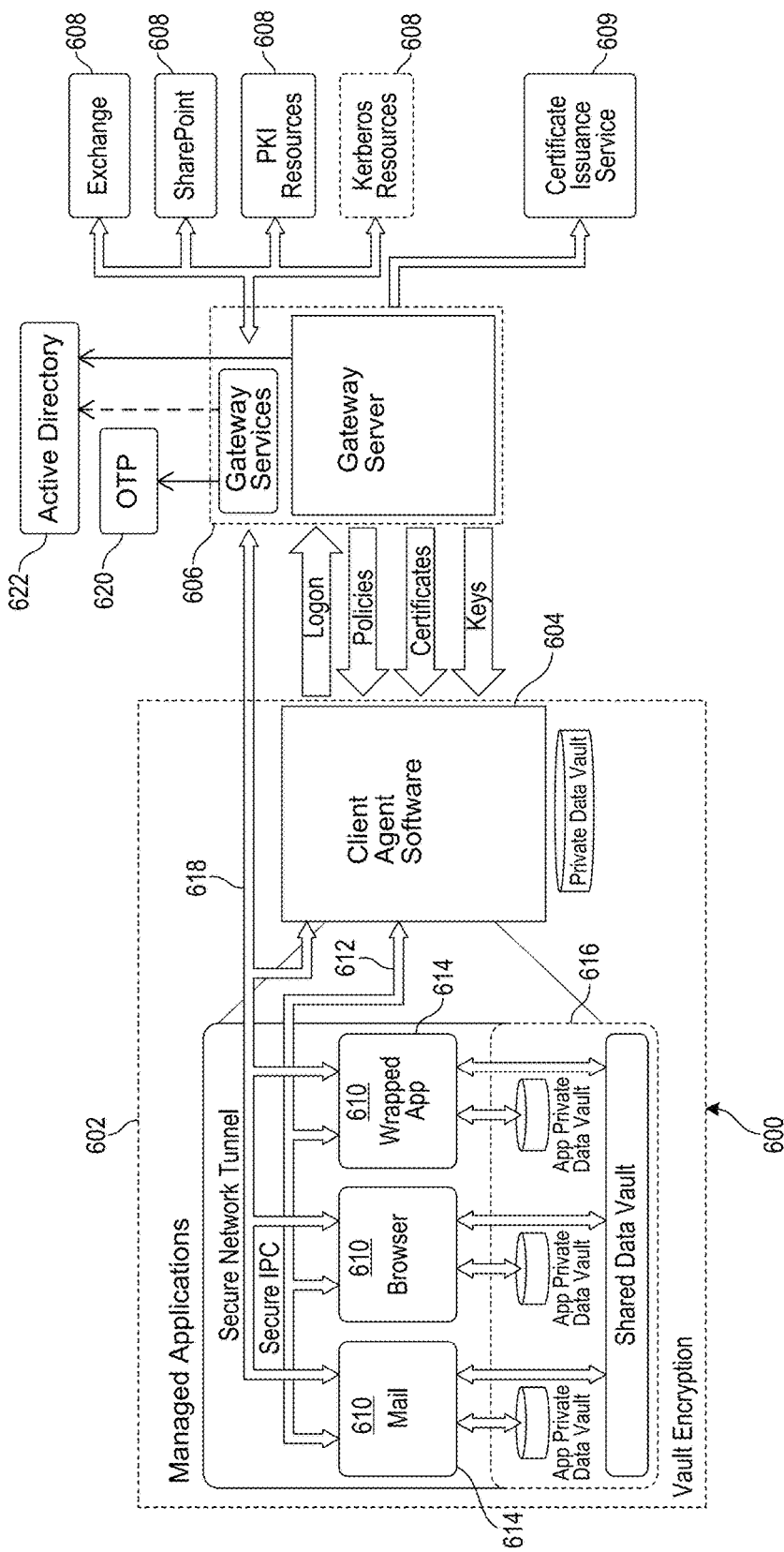
FIG. 6 depicts another illustrative enterprise mobility management system in accordance with one or more illustrative aspects described herein.

FIG. 6 is another illustrative enterprise mobility management system 600. Some of the components of the mobility management system 500 described above with reference to FIG. 5 have been omitted for the sake of simplicity. The architecture of the system 600 depicted in FIG. 6 is similar in many respects to the architecture of the system 500 described above with reference to FIG. 5 and may include additional features not mentioned above.

In this case, the left hand side represents an enrolled mobile device 602 with a client agent 604, which interacts with gateway server 606 (which includes Access Gateway and application controller functionality) to access various enterprise resources 608 and services 609 such as Exchange, Sharepoint, public-key infrastructure (PKI) Resources, Kerberos Resources, Certificate Issuance service, as shown on the right hand side above. Although not specifically shown, the mobile device 602 may also interact with an enterprise application store (StoreFront) for the selection and downloading of applications.

The client agent 604 acts as the UI (user interface) intermediary for Windows apps/desktops hosted in an Enterprise data center, which are accessed using the High-Definition User Experience (HDX)/ICA display remoting protocol. The client agent 604 also supports the installation and management of native applications on the mobile device 602, such as native iOS or Android applications. For example, the managed applications 610 (mail, browser, wrapped application) shown in FIG. 6 are all native applications that execute locally on the device. Client agent 604 and application management framework of this architecture act to provide policy driven management capabilities and features such as connectivity and SSO (single sign on) to enterprise resources/services 608. The client agent 604 handles primary user authentication to the enterprise, normally to Access Gateway (AG) with SSO to other gateway server components. The client agent 604 obtains policies from gateway server 606 to control the behavior of the managed applications 610 on the mobile device 602.

The Secure interprocess communication (IPC) links 612 between the native applications 610 and client agent 604 represent a management channel, which allows client agent to supply policies to be enforced by the application management framework 614 "wrapping" each application. The IPC channel 612 also allows client agent 604 to supply credential and authentication information that enables connectivity and SSO to enterprise resources 608. Finally the IPC channel 612 allows the application management framework 614 to invoke user interface functions implemented by client agent 604, such as online and offline authentication.

Communications between the client agent 604 and gateway server 606 are essentially an extension of the management channel from the application management framework 614 wrapping each native managed application 610. The application management framework 614 requests policy information from client agent 604, which in turn requests it from gateway server 606. The application management framework 614 requests authentication, and client agent 604 logs into the gateway services part of gateway server 606 (also known as NetScaler Access Gateway). Client agent 604 may also call supporting services on gateway server 606, which may produce input material to derive encryption keys for the local data vaults 616, or provide client certificates which may enable direct authentication to PKI protected resources, as more fully explained below.

In more detail, the application management framework 614 "wraps" each managed application 610. This may be incorporated via an explicit build step, or via a post-build processing step. The application management framework 614 may "pair" with client agent 604 on first launch of an application 610 to initialize the Secure IPC channel and obtain the policy for that application. The application management framework 614 may enforce relevant portions of the policy that apply locally, such as the client agent login dependencies and some of the containment policies that restrict how local OS services may be used, or how they may interact with the application 610.

The application management framework 614 may use services provided by client agent 604 over the Secure IPC channel 612 to facilitate authentication and internal network access. Key management for the private and shared data vaults 616 (containers) may be also managed by appropriate interactions between the managed applications 610 and client agent 604. Vaults 616 may be available only after online authentication, or may be made available after offline authentication if allowed by policy. First use of vaults 616 may require online authentication, and offline access may be limited to at most the policy refresh period before online authentication is again required.

Network access to internal resources may occur directly from individual managed applications 610 through Access Gateway 606. The application management framework 614 is responsible for orchestrating the network access on behalf of each application 610. Client agent 604 may facilitate these network connections by providing suitable time limited secondary credentials obtained following online authentication. Multiple modes of network connection may be used, such as reverse web proxy connections and end-to-end VPN-style tunnels 618.

The Mail and Browser managed applications 610 have special status and may make use of facilities that might not be generally available to arbitrary wrapped applications. For example, the Mail application may use a special background network access mechanism that allows it to access Exchange over an extended period of time without requiring a full AG logon. The Browser application may use multiple private data vaults to segregate different kinds of data.

This architecture supports the incorporation of various other security features. For example, gateway server 606 (including its gateway services) in some cases will not need to validate active directory (AD) passwords. It can be left to the discretion of an enterprise whether an AD password is used as an authentication factor for some users in some situations. Different authentication methods may be used if a user is online or offline (i.e., connected or not connected to a network).

Step up authentication is a feature wherein gateway server 606 may identify managed native applications 610 that are allowed to have access to highly classified data requiring strong authentication, and ensure that access to these applications is only permitted after performing appropriate authentication, even if this means a re-authentication is required by the user after a prior weaker level of login.

Another security feature of this solution is the encryption of the data vaults 616 (containers) on the mobile device 602. The vaults 616 may be encrypted so that all on-device data including files, databases, and configurations are protected. For on-line vaults, the keys may be stored on the server (gateway server 606), and for off-line vaults, a local copy of the keys may be protected by a user password or biometric validation. When data is stored locally on the device 602 in the secure container 616, it is preferred that a minimum of AES 256 encryption algorithm be utilized.

Other secure container features may also be implemented. For example, a logging feature may be included, wherein all security events happening inside an application 610 are logged and reported to the backend. Data wiping may be supported, such as if the application 610 detects tampering, associated encryption keys may be written over with random data, leaving no hint on the file system that user data was destroyed. Screenshot protection is another feature, where an application may prevent any data from being stored in screenshots. For example, the key window's hidden property may be set to YES. This may cause whatever content is currently displayed on the screen to be hidden, resulting in a blank screenshot where any content would normally reside.

Local data transfer may be prevented, such as by preventing any data from being locally transferred outside the application container, e.g., by copying it or sending it to an external application. A keyboard cache feature may operate to disable the autocorrect functionality for sensitive text fields. SSL certificate validation may be operable so the application specifically validates the server SSL certificate instead of it being stored in the keychain. An encryption key generation feature may be used such that the key used to encrypt data on the device is generated using a passphrase or biometric data supplied by the user (if offline access is required). It may be XORed with another key randomly generated and stored on the server side if offline access is not required. Key Derivation functions may operate such that keys generated from the user password use KDFs (key derivation functions, notably Password-Based Key Derivation Function 2 (PBKDF2)) rather than creating a cryptographic hash of it. The latter makes a key susceptible to brute force or dictionary attacks.

Further, one or more initialization vectors may be used in encryption methods. An initialization vector will cause multiple copies of the same encrypted data to yield different cipher text output, preventing both replay and cryptanalytic attacks. This will also prevent an attacker from decrypting any data even with a stolen encryption key if the specific initialization vector used to encrypt the data is not known. Further, authentication then decryption may be used, wherein application data is decrypted only after the user has authenticated within the application. Another feature may relate to sensitive data in memory, which may be kept in memory (and not in disk) only when it's needed. For example, login credentials may be wiped from memory after login, and encryption keys and other data inside objective-C instance variables are not stored, as they may be easily referenced. Instead, memory may be manually allocated for these.

An inactivity timeout may be implemented, wherein after a policy-defined period of inactivity, a user session is terminated.

Data leakage from the application management framework 614 may be prevented in other ways. For example, when an application 610 is put in the background, the memory may be cleared after a predetermined (configurable) time period. When backgrounded, a snapshot may be taken of the last displayed screen of the application to fasten the foregrounding process. The screenshot may contain confidential data and hence should be cleared.

Another security feature relates to the use of an OTP (one time password) 620 without the use of an AD (active directory) 622 password for access to one or more applications. In some cases, some users do not know (or are not permitted to know) their AD password, so these users may authenticate using an OTP 620 such as by using a hardware OTP system like SecurID (OTPs may be provided by different vendors also, such as Entrust or Gemalto). In some cases, after a user authenticates with a user ID, a text is sent to the user with an OTP 620. In some cases, this may be implemented only for online use, with a prompt being a single field.

An offline password may be implemented for offline authentication for those applications 610 for which offline use is permitted via enterprise policy. For example, an enterprise may want StoreFront to be accessed in this manner. In this case, the client agent 604 may require the user to set a custom offline password and the AD password is not used. Gateway server 606 may provide policies to control and enforce password standards with respect to the minimum length, character class composition, and age of passwords, such as described by the standard Windows Server password complexity requirements, although these requirements may be modified.

Another feature relates to the enablement of a client side certificate for certain applications 610 as secondary credentials (for the purpose of accessing PKI protected web resources via the application management framework micro VPN feature). For example, an application may utilize such a certificate. In this case, certificate-based authentication using ActiveSync protocol may be supported, wherein a certificate from the client agent 604 may be retrieved by gateway server 606 and used in a keychain. Each managed application may have one associated client certificate, identified by a label that is defined in gateway server 606.

Gateway server 606 may interact with an Enterprise special purpose web service to support the issuance of client certificates to allow relevant managed applications to authenticate to internal PKI protected resources.

The client agent 604 and the application management framework 614 may be enhanced to support obtaining and using client certificates for authentication to internal PKI protected network resources. More than one certificate may be supported, such as to match various levels of security and/or separation requirements. The certificates may be used by the Mail and Browser managed applications, and ultimately by arbitrary wrapped applications (provided those applications use web service style communication patterns where it is reasonable for the application management framework to mediate https requests).

Application management client certificate support on iOS may rely on importing a public-key cryptography standards (PKCS) 12 BLOB (Binary Large Object) into the iOS keychain in each managed application for each period of use. Application management framework client certificate support may use a HTTPS implementation with private in-memory key storage. The client certificate will never be present in the iOS keychain and will not be persisted except potentially in "online-only" data value that is strongly protected.

Mutual SSL may also be implemented to provide additional security by requiring that a mobile device 602 is authenticated to the enterprise, and vice versa. Virtual smart cards for authentication to gateway server 606 may also be implemented.

Both limited and full Kerberos support may be additional features. The full support feature relates to an ability to do full Kerberos login to Active Directory (AD) 622, using an AD password or trusted client certificate, and obtain Kerberos service tickets to respond to HTTP Negotiate authentication challenges. The limited support feature relates to constrained delegation in Citrix Access Gateway Enterprise Edition (AGEE), where AGEE supports invoking Kerberos protocol transition so it can obtain and use Kerberos service tickets (subject to constrained delegation) in response to HTTP Negotiate authentication challenges. This mechanism works in reverse web proxy (aka corporate virtual private network (CVPN)) mode, and when http (but not https) connections are proxied in VPN and MicroVPN mode.

Another feature relates to application container locking and wiping, which may automatically occur upon jail-break or rooting detections, and occur as a pushed command from administration console, and may include a remote wipe functionality even when an application 610 is not running.

A multi-site architecture or configuration of enterprise application store and an application controller may be supported that allows users to be service from one of several different locations in case of failure.

In some cases, managed applications 610 may be allowed to access a certificate and private key via an API (example OpenSSL). Trusted managed applications 610 of an enterprise may be allowed to perform specific Public Key operations with an application's client certificate and private key. Various use cases may be identified and treated accordingly, such as when an application behaves like a browser and no certificate access is required, when an application reads a certificate for "who am I," when an application uses the certificate to build a secure session token, and when an application uses private keys for digital signing of important data (e.g. transaction log) or for temporary data encryption.

Tracking and Managing Virtual Desktops Using Signed Tokens

As discussed above, aspects of the disclosure relate to tracking and managing virtual desktops using signed tokens. In addition, one or more aspects of the disclosure may incorporate, be embodied in, and/or be implemented using one or more of the computer system architecture, remote-access system architecture, virtualized (hypervisor) system architecture, cloud-based system architecture, and/or enterprise mobility management systems discussed above in connection with FIGS. 1-6.

One deployment model that may be used when implementing a virtual desktop infrastructure (VDI) is a pooled desktop model. In a pooled desktop model, there may be a single disk image and a pool of identical desktops that are shared by a group of users. A particular user may log in and use one of the desktops in the pool. When the user logs out of the desktop, the desktop used by the user may be reimaged (e.g., using provisioning technology such as CITRIX Provisioning Server or Machine Creation Services) before being returned to the pool and being made available for use by another user.

In some instances, a pooled desktop model (which may, e.g., also be referred to as a "pooled VDI" model) may present one or more security challenges. For instance, a malicious user might use their shared desktop to compromise the desktops of others. For example, such a user might be able to install a keystroke logger on his or her own desktop and then modify the desktop to report itself as being unused. If the user accomplished this, another user might be brokered to the compromised desktop and then the other user's account may be compromised.

One or more aspects of the disclosure may address and/or overcome such security challenges. For example, in accordance with one or more aspects of the disclosure, a public/private key pair for a trusted authority may be created when a pooled VDI deployment is installed. The trusted authority may be a Desktop Delivery Controller (DDC) of the site, a Connector (e.g., in cases where CITRIX Workspace Cloud is used), or a provisioning service (e.g., CITRIX Provisioning Server or Machine Creation Services) that creates desktop machines. The public key may be replicated out to all of the infrastructure elements that might need to determine whether a particular desktop is clean or tainted.

Subsequently, when a pooled VDI desktop boots, the desktop may obtain a token signed by the trusted authority. The signed token may be stored in the disk of the desktop itself as it is created (e.g., the signed token may be "baked" into and/or otherwise included in the disk image from which the virtual desktop is booted), or the signed token may be delivered over a network at first registration and held in memory.

Thereafter, the software installed on the VDI desktop may securely delete its signed token before accepting any user connection. Thus, an end user who connects to the desktop will not be able to read the token, even if the particular user is an administrator and/or otherwise have full access to the machine.

In addition, a server and/or other infrastructure elements may securely determine, at any time, whether a particular desktop is tainted by querying the desktop for a token and subsequently checking the returned token against the known public key. A desktop may be considered untainted if the desktop presents a signed token that is validated using the corresponding public key. Otherwise, the desktop may be considered tainted. Additionally, a malicious user may be unable to tamper with the token or cause a tainted desktop to present itself as untainted because (1) the signed token would have been deleted from the desktop before the malicious user logged in, and (2) the private key needed to generate the signed tokens may be held on a trusted authority that is separate from the desktops themselves.

Figure 7A:
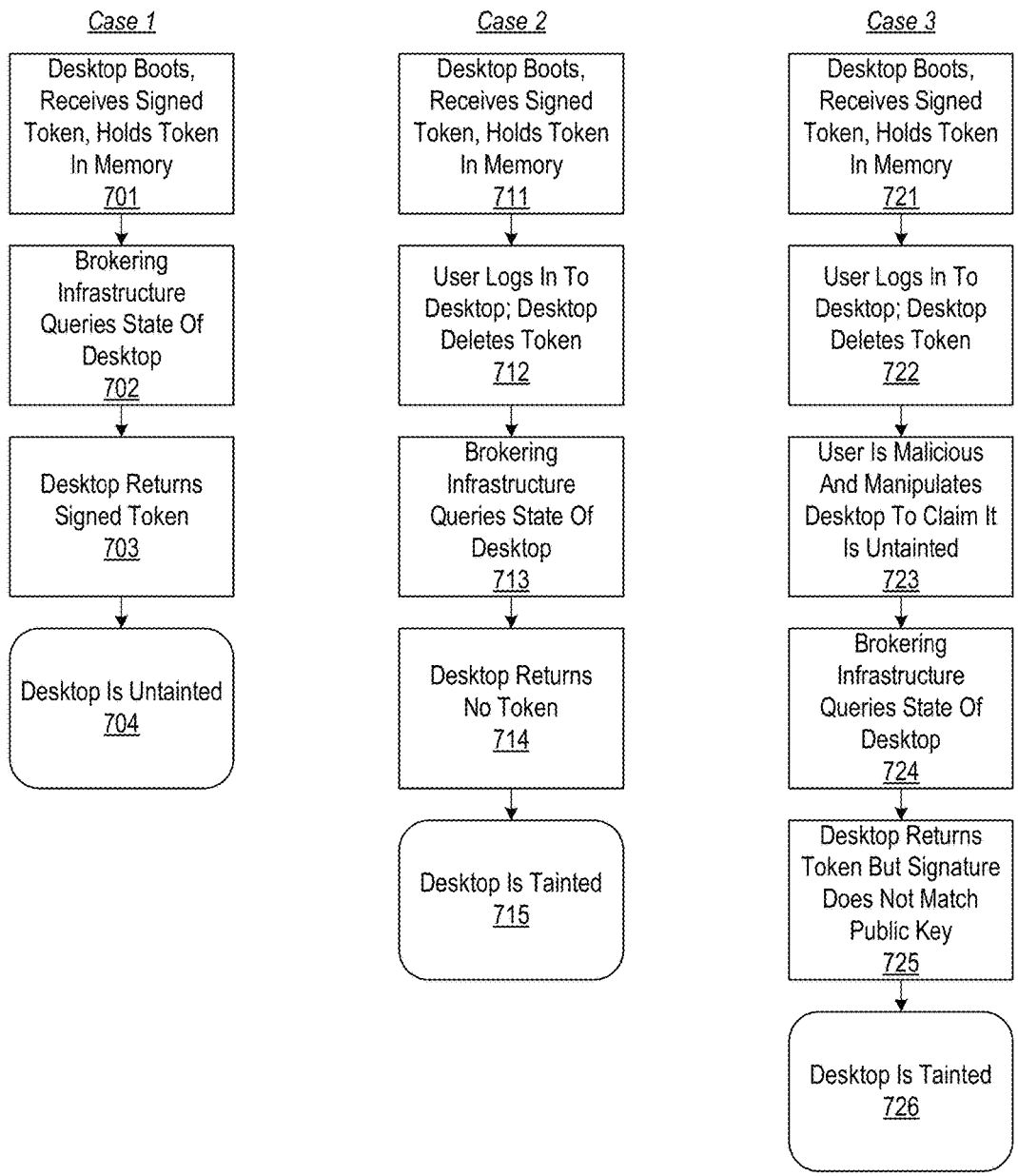
FIGS. 7A and 7B depict examples of tracking and managing virtual desktops using signed tokens in accordance with one or more illustrative aspects described herein.
Figure 7B:
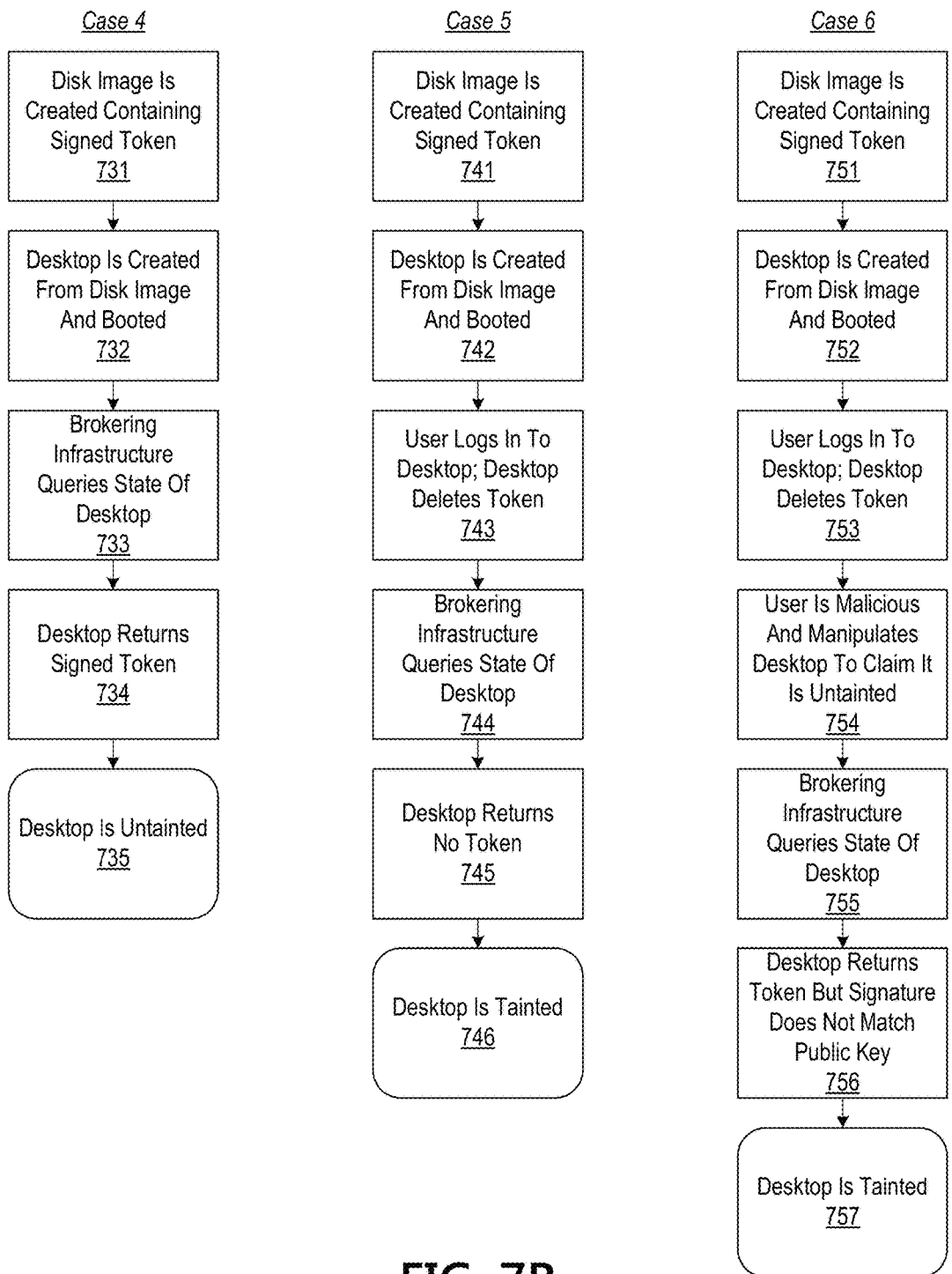

FIGS. 7A and 7B depict examples of tracking and managing virtual desktops using signed tokens in accordance with one or more illustrative aspects described herein. In particular, the examples shown in FIG. 7A illustrate cases in which a virtual desktop may receive a signed token from a trusted authority at initial registration, and the examples shown in FIG. 7B illustrate cases in which a virtual desktop is created and booted from a disk image containing a signed token.

Referring to FIG. 7A, in a first example case, at step 701, a virtual desktop may be booted. The desktop may receive a signed token and hold the token in memory. At step 702, brokering infrastructure may query the state of the desktop. At step 703, the desktop may return the signed token to the brokering infrastructure, which may confirm that the signed token is valid using a corresponding public key. At step 704, the brokering infrastructure may determine that the desktop is untainted (e.g., based on confirming that the signed token is valid).

In a second example case, at step 711, a virtual desktop may be booted. The desktop may receive a signed token and hold the token in memory. At step 712, a user may log in to the desktop, and the desktop may delete the signed token. At step 713, brokering infrastructure may query the state of the desktop. At step 714, the desktop might not return a token, since the signed token was deleted by the desktop when the user logged in. At step 715, the brokering infrastructure may determine that the desktop is tainted (e.g., based on the desktop failing to return a token).

In a third example case, at step 721, a virtual desktop may be booted. The desktop may receive a signed token and hold the token in memory. At step 722, a user may log in to the desktop, and the desktop may delete the signed token. At step 723, the user may perform one or more malicious actions and/or may manipulate the desktop to attempt to present the desktop as untainted. At step 724, brokering infrastructure may query the state of the desktop. At step 725, the desktop may return a token (e.g., as a result of the malicious user actions), but the token's signature might not match a corresponding public key (e.g., because the signed token that was created by the trusted authority was deleted by the desktop when the user logged in, and because the token that was returned at step 725 was returned as a result of the malicious user actions). At step 726, the brokering infrastructure may determine that the desktop is tainted (e.g., based on the token's signature failing to match a corresponding public key).

Referring to FIG. 7B, in a fourth example case, at step 731, a disk image is created that contains a signed token. At step 732, a desktop is created from the disk image that contains the signed token, and the desktop is booted. At step 733, brokering infrastructure may query the state of the desktop. At step 734, the desktop may return the signed token to the brokering infrastructure, which may confirm that the signed token is valid using a corresponding public key. At step 735, the brokering infrastructure may determine that the desktop is untainted (e.g., based on confirming that the signed token is valid).

In a fifth example case, at step 741, a disk image is created that contains a signed token. At step 742, a desktop is created from the disk image that contains the signed token, and the desktop is booted. At step 743, a user may log in to the desktop, and the desktop may delete the signed token. At step 744, brokering infrastructure may query the state of the desktop. At step 745, the desktop might not return a token, since the signed token was deleted by the desktop when the user logged in. At step 746, the brokering infrastructure may determine that the desktop is tainted (e.g., based on the desktop failing to return a token).

In a sixth example case, at step 751, a disk image is created that contains a signed token. At step 752, a desktop is created from the disk image that contains the signed token, and the desktop is booted. At step 753, a user may log in to the desktop, and the desktop may delete the signed token. At step 754, the user may perform one or more malicious actions and/or may manipulate the desktop to attempt to present the desktop as untainted. At step 755, brokering infrastructure may query the state of the desktop. At step 756, the desktop may return a token (e.g., as a result of the malicious user actions), but the token's signature might not match a corresponding public key (e.g., because the signed token that was created by the trusted authority was deleted by the desktop when the user logged in, and because the token that was returned at step 756 was returned as a result of the malicious user actions). At step 757, the brokering infrastructure may determine that the desktop is tainted (e.g., based on the token's signature failing to match a corresponding public key).

Figure 8A:
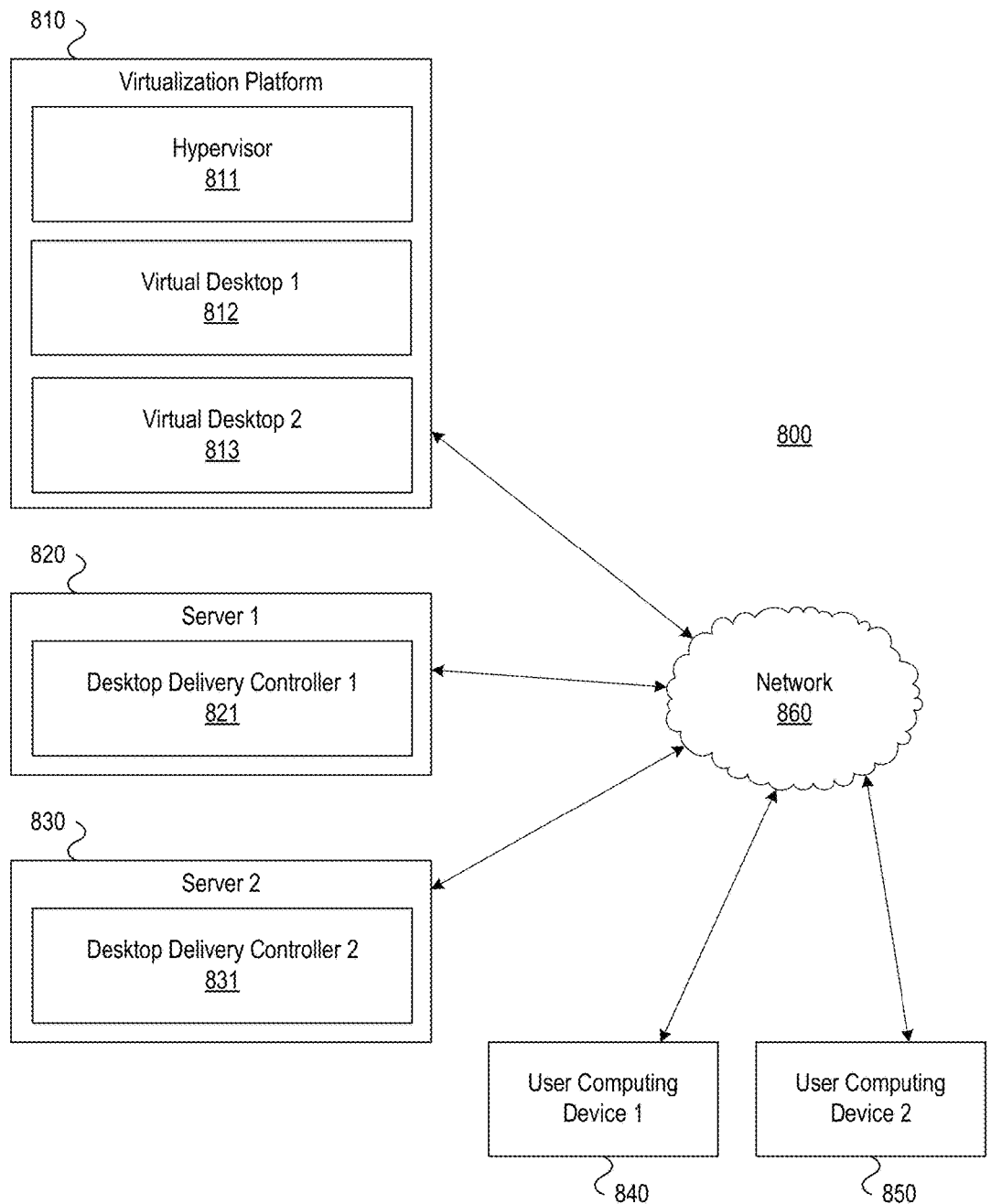
FIGS. 8A and 8B depict an illustrative computing environment for tracking and managing virtual desktops using signed tokens in accordance with one or more illustrative aspects described herein.
Figure 8B:
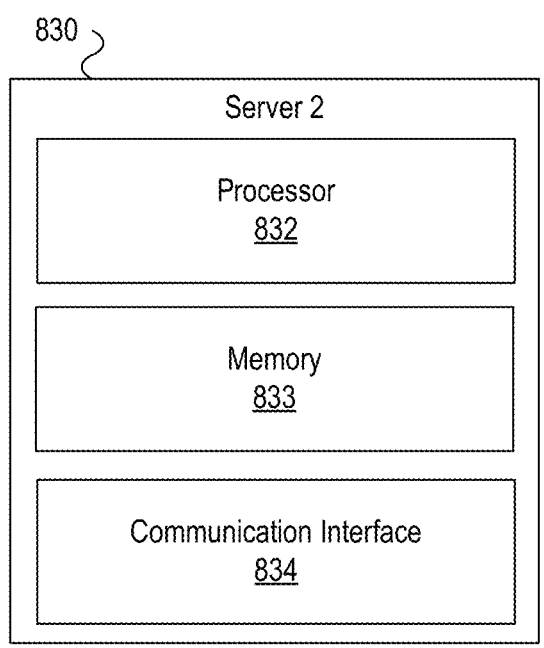

FIGS. 8A and 8B depict an illustrative computing environment for tracking and managing virtual desktops using signed tokens in accordance with one or more illustrative aspects described herein. Referring to FIG. 8A, computing environment 800 may include a virtualization platform 810, one or more server computing devices (e.g., server computing device 820, server computing device 830), one or more user computing devices (e.g., user computing device 840, user computing device 850), and a network 860. Virtualization platform 810, server computing device 820, server computing device 830, user computing device 840, and user computing device 850 may include one or more physical components, such as one or more processors, memories, communication interfaces, and/or the like.

Virtualization platform 810 may incorporate one or more aspects of virtualization server 301. For example, virtualization platform 810 may include a hypervisor 811, which may incorporate one or more aspects of hypervisor 302. In addition, virtualization platform 810 may provide one or more virtual desktops (e.g., virtual desktop 812, virtual desktop 813), which may incorporate one or more aspects of the virtual machines discussed above, such as virtual machines 332. Each of the one or more server computing devices in computing environment 800 may be configured to provide a desktop delivery controller service (which may, e.g., provide end users with brokered connections to one or more virtual machines, as illustrated in greater detail below). For example, server computing device 820 may provide desktop delivery controller service 821, and server computing device 830 may provide desktop delivery controller service 831. As illustrated in greater detail below, server computing device 830 may operate as a redundant server relative to server computing device 820 (e.g., to broker connections to virtual desktops in the event that server computing device 820 fails for some reason).

Each of the user computing devices in computing environment 800 may be configured to be used by different end users (who may, e.g., utilize the user computing devices to access one or more virtual desktops provided by virtualization platform 810). For example, user computing device 840 may be configured to be used by a first user, and user computing device 850 may be configured to be used by a second user different from the first user. Network 860 may include one or more wide area networks and/or local area networks and may interconnect one or more systems and/or devices included in computing environment 800. For example, network 860 may interconnect virtualization platform 810, server computing device 820, server computing device 830, user computing device 840, and/or user computing device 850.

Referring to FIG. 8B, server computing device 830 may include processor 832, memory 833, and communication interface 834. Processor 832 may execute instructions stored in memory 833 to cause server computing device 830 to perform one or more functions, such as providing desktop delivery controller service 831. Communication interface 834 may include one or more network interfaces via which server computing device 830 can communicate with one or more other systems and/or devices in computing environment 800, such as virtualization platform 810, server computing device 820, user computing device 840, user computing device 850, and/or one or more other systems and/or devices.

Figure 9A:
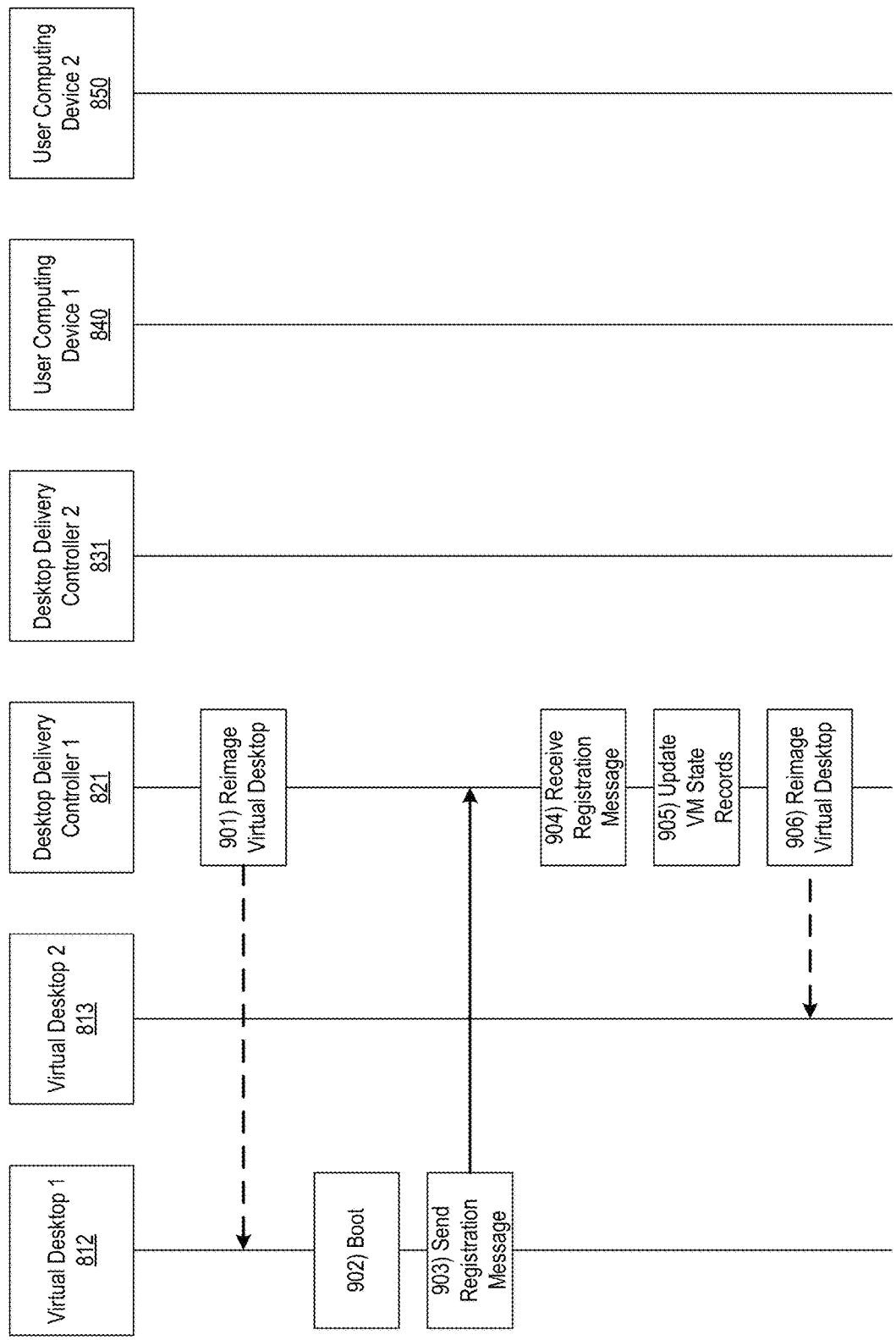

FIGS. 9A-9F depict an example event sequence for tracking and managing virtual desktops using signed tokens in accordance with one or more illustrative aspects described herein. Referring to FIG. 9A, at step 901, desktop delivery controller 821 and/or server computing device 820 may reimage virtual desktop 812 (e.g., by sending one or more commands to virtualization platform 810 and/or hypervisor 811 that direct and/or cause virtualization platform 810 and/or hypervisor 811 to reimage virtual desktop 812). At step 902, virtual desktop 812 may be booted (e.g., by virtualization platform 810). At step 903, virtual desktop 812 may send a registration message to desktop delivery controller 821 and/or server computing device 820. For example, having just booted, virtual desktop 812 may send an initial registration message to desktop delivery controller 821 and/or server computing device 820 in order to receive a signed token from desktop delivery controller 821 and/or server computing device 820 and/or to otherwise register as a clean and/or untainted virtual machine. In other instances, a signed token may exist in the disk image from which virtual desktop 812 is created and/or booted, and virtual desktop 812 may have a signed token as a result of being created and/or booted by virtualization platform 810.

At step 904, desktop delivery controller 821 and/or server computing device 820 may receive the registration message from virtual desktop 812. For example, desktop delivery controller 821 and/or server computing device 820 may provide virtual desktop 812 with a signed token at initial registration if virtual desktop 812 does not already have such a token. Additionally or alternatively, desktop delivery controller 821 and/or server computing device 820 may check the validity of a signed token held by virtual desktop 812 (e.g., in instances in which the signed token exists in the disk image from which virtual desktop 812 is created and/or booted) by evaluating the signed token using a public key corresponding to the private key associated with the signed token. Additionally or alternatively, desktop delivery controller 821 and/or server computing device 820 may store registration information associated with virtual desktop 812 and/or the registration message received from virtual desktop 812.

At step 905, desktop delivery controller 821 and/or server computing device 820 may update one or more virtual machine state records. For instance, desktop delivery controller 821 and/or server computing device 820 may update one or more virtual machine state records maintained by server computing device 820 to track which virtual machines have been used and/or tainted and/or which virtual machines have not been used and/or are untainted. For example, at step 905, having registered, provisioned, and/or verified the signed token held by virtual desktop 812, desktop delivery controller 821 and/or server computing device 820 may update one or more virtual machine state records to indicate that virtual desktop 812 is not tainted and/or has not been used.

Figure 9B:
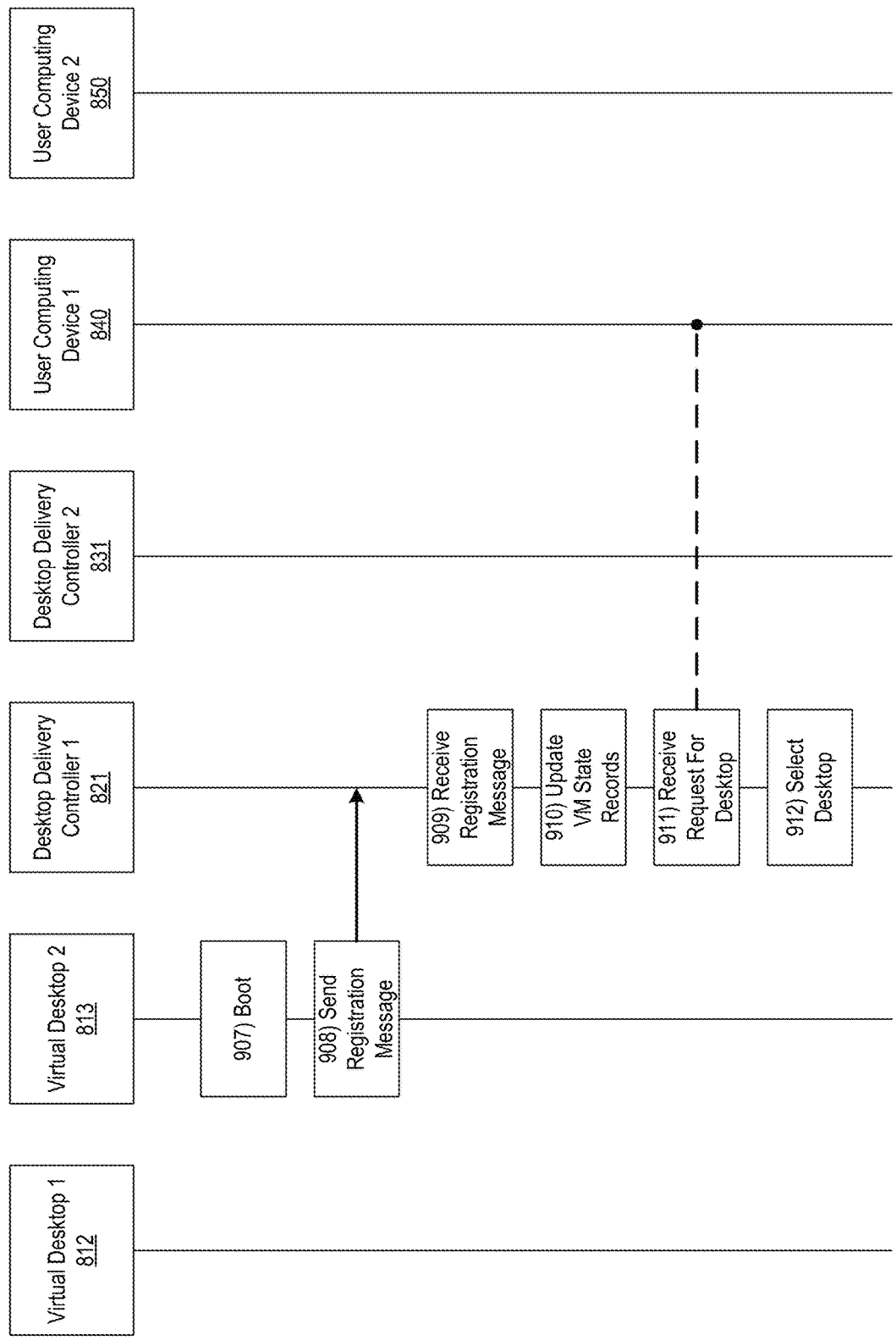

At step 906, desktop delivery controller 821 and/or server computing device 820 may reimage virtual desktop 813 (e.g., by sending one or more commands to virtualization platform 810 and/or hypervisor 811 that direct and/or cause virtualization platform 810 and/or hypervisor 811 to reimage virtual desktop 813). Referring to FIG. 9B, at step 907, virtual desktop 813 may be booted (e.g., by virtualization platform 810). At step 908, virtual desktop 813 may send a registration message to desktop delivery controller 821 and/or server computing device 820. For example, having just booted, virtual desktop 813 may send an initial registration message to desktop delivery controller 821 and/or server computing device 820 in order to receive a signed token from desktop delivery controller 821 and/or server computing device 820 and/or to otherwise register as a clean and/or untainted virtual machine. In other instances, a signed token may exist in the disk image from which virtual desktop 813 is created and/or booted, and virtual desktop 813 may have a signed token as a result of being created and/or booted by virtualization platform 810.

At step 909, desktop delivery controller 821 and/or server computing device 820 may receive the registration message from virtual desktop 813. For example, desktop delivery controller 821 and/or server computing device 820 may provide virtual desktop 813 with a signed token at initial registration if virtual desktop 813 does not already have such a token. Additionally or alternatively, desktop delivery controller 821 and/or server computing device 820 may check the validity of a signed token held by virtual desktop 813 (e.g., in instances in which the signed token exists in the disk image from which virtual desktop 813 is created and/or booted) by evaluating the signed token using a public key corresponding to the private key associated with the signed token. Additionally or alternatively, desktop delivery controller 821 and/or server computing device 820 may store registration information associated with virtual desktop 813 and/or the registration message received from virtual desktop 813.

At step 910, desktop delivery controller 821 and/or server computing device 820 may update one or more virtual machine state records. For instance, desktop delivery controller 821 and/or server computing device 820 may update one or more virtual machine state records maintained by server computing device 820 to track which virtual machines have been used and/or tainted and/or which virtual machines have not been used and/or are untainted. For example, at step 910, having registered, provisioned, and/or verified the signed token held by virtual desktop 813, desktop delivery controller 821 and/or server computing device 820 may update one or more virtual machine state records to indicate that virtual desktop 813 is not tainted and/or has not been used.

At step 911, desktop delivery controller 821 and/or server computing device 820 may receive a request for a virtual desktop from user computing device 840. At step 912, desktop delivery controller 821 and/or server computing device 820 may select a virtual desktop based on one or more virtual machine state records (e.g., in response to receiving the request at step 911). For example, at step 912, desktop delivery controller 821 and/or server computing device 820 may select a virtual desktop to provide a brokered virtual desktop session to user computing device 840. In selecting a virtual desktop, desktop delivery controller 821 and/or server computing device 820 may, for example, select an untainted and/or unused desktop based on one or more virtual machine state records (which may, e.g., identify which desktops are untainted and/or unused). For example, desktop delivery controller 821 and/or server computing device 820 may select virtual desktop 812 based on one or more virtual machine state records indicating that virtual desktop 812 is untainted and/or unused.

Figure 9C:
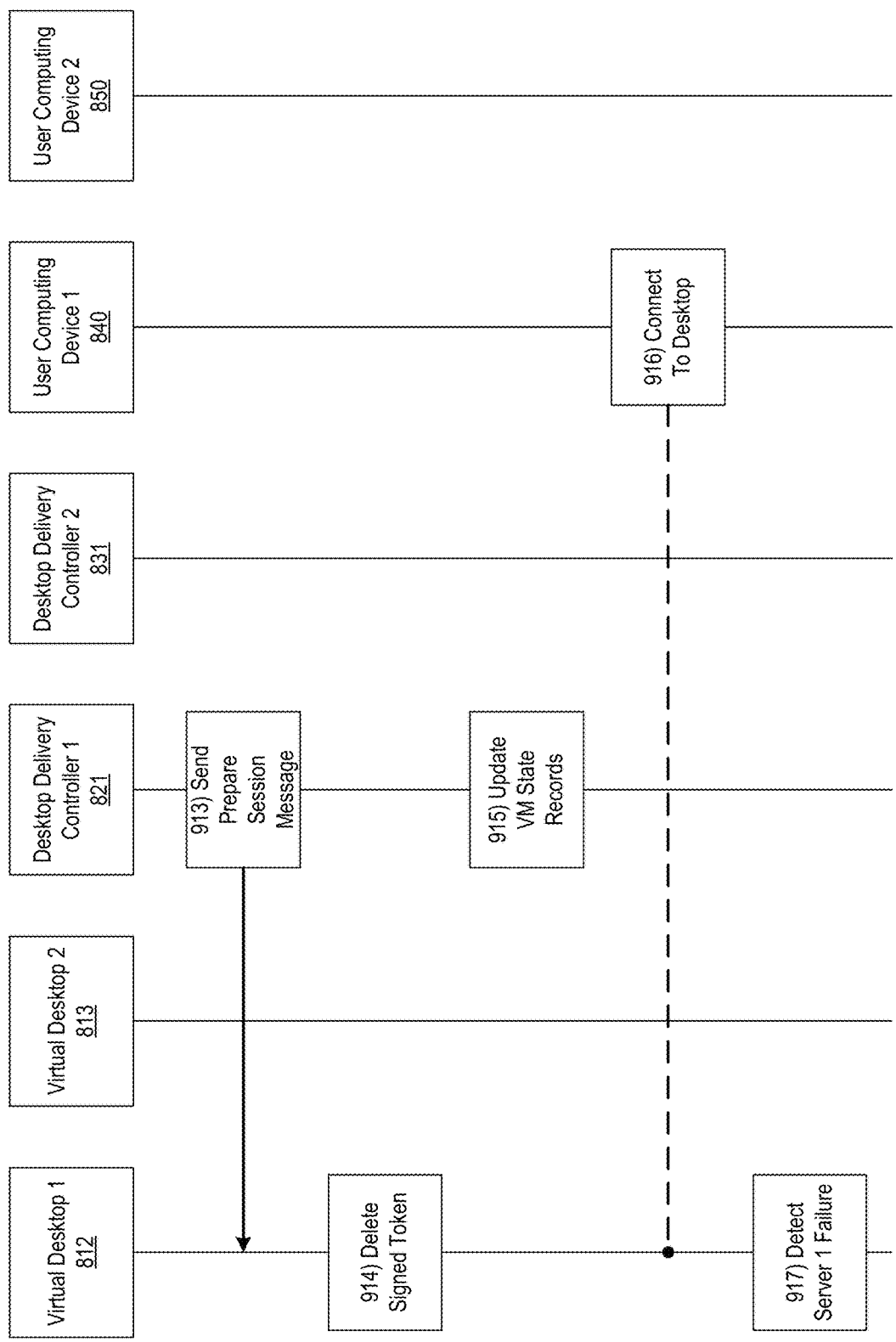

Referring to FIG. 9C, at step 913, desktop delivery controller 821 and/or server computing device 820 may send a prepare session message to virtual desktop 812. For example, at step 913, desktop delivery controller 821 and/or server computing device 820 may send a prepare session message to virtual desktop 812 to broker and/or otherwise provide a connection to virtual desktop 812 for user computing device 840. At step 914, virtual desktop 812 may delete its signed token. For example, at step 914, virtual desktop 812 may delete the signed token maintained by virtual desktop 812 in response to receiving the prepare session message from desktop delivery controller 821 and/or server computing device 820 (and, e.g., before connecting to user computing device 840 or any other user device). At step 915, desktop delivery controller 821 and/or server computing device 820 may update one or more virtual machine state records. For example, at step 915, desktop delivery controller 821 and/or server computing device 820 may update one or more virtual machine state records to indicate that user computing device 840 is being and/or has connected to virtual desktop 812 and/or to indicate that virtual desktop 812 has been tainted (e.g., because virtual desktop 812 is being and/or has been connected to and/or used by user computing device 840). At step 916, user computing device 840 may connect to virtual desktop 812. Desktop delivery controller 821 and/or server computing device 820 may, for example, update one or more virtual machine state records to indicate that user computing device 840 is being and/or has connected to virtual desktop 812 and/or to indicate that virtual desktop 812 has been tainted before allowing user computing device 840 and/or a user of user computing device 840 to connect to virtual desktop 812 to prevent multiple users from accessing virtual desktop 812 and/or to otherwise improve security (e.g., in instances in which desktop delivery controller 821 and/or server computing device 820 is simultaneously processing multiple requests, for instance, from multiple users and/or devices).

Subsequently, server computing device 820 may fail (e.g., server computing device 820 may crash, shut down, lose one or more network connections, or the like). After server computing device 820 fails, the virtual machines (e.g., virtual desktop 812, virtual desktop 813) may detect that desktop delivery controller 821 and/or server computing device 820 has failed and may attempt to register with another server computing device (e.g., server computing device 830), as illustrated in greater detail below.

At step 917, virtual desktop 812 may detect that desktop delivery controller 821 and/or server computing device 820 has failed. For example, virtual desktop 812 may detect that desktop delivery controller 821 and/or server computing device 820 has failed based on a connection between virtual desktop 812 and desktop delivery controller 821 and/or server computing device 820 failing, based on a ping signal from desktop delivery controller 821 and/or server computing device 820 to virtual desktop 812 failing, based on a ping signal from virtual desktop 812 to desktop delivery controller 821 and/or server computing device 820 failing, and/or the like. Referring to FIG. 9D, at step 918, virtual desktop 813 may detect that desktop delivery controller 821 and/or server computing device 820 has failed. For example, virtual desktop 813 may detect that desktop delivery controller 821 and/or server computing device 820 has failed based on a connection between virtual desktop 813 and desktop delivery controller 821 and/or server computing device 820 failing, based on a ping signal from desktop delivery controller 821 and/or server computing device 820 to virtual desktop 813 failing, based on a ping signal from virtual desktop 813 to desktop delivery controller 821 and/or server computing device 820 failing, and/or the like.

At step 919, virtual desktop 812 may send a registration message to desktop delivery controller 831 and/or server computing device 830 (e.g., in response to detecting that desktop delivery controller 821 and/or server computing device 820 has failed). For example, virtual desktop 812 may send a registration message to desktop delivery controller 831 and/or server computing device 830 based on information identifying server computing device 830 as a redundant server and/or failover server for server computing device 820. At step 920, desktop delivery controller 831 and/or server computing device 830 may receive the registration message from virtual desktop 812. For example, at step 920, desktop delivery controller 831 and/or server computing device 830 may receive, via a communication interface (e.g., communication interface 834), a first registration message from a first virtual machine (e.g., virtual desktop 812).

At step 921, desktop delivery controller 831 and/or server computing device 830 may determine the state of virtual desktop 812. For example, at step 921, desktop delivery controller 831 and/or server computing device 830 may determine a state of the first virtual machine (e.g., virtual desktop 812) based on token information associated with the first registration message received from the first virtual machine (e.g., virtual desktop 812). For instance, desktop delivery controller 831 and/or server computing device 830 may determine that virtual desktop 812 is tainted, since virtual desktop 812 may have previously deleted its signed token and thus the first registration message received by desktop delivery controller 831 and/or server computing device 830 from virtual desktop 812 might not include a valid and signed token.

In some embodiments, determining the state of the first virtual machine based on the token information associated with the first registration message received from the first virtual machine may include determining whether the first virtual machine is tainted. For example, in determining the state of the first virtual machine (e.g., virtual desktop 812) based on the token information associated with the first registration message received from the first virtual machine (e.g., virtual desktop 812), desktop delivery controller 831 and/or server computing device 830 may determine whether the first virtual machine (e.g., virtual desktop 812) is tainted.

In some instances, determining whether the first virtual machine is tainted may include determining that the first virtual machine is not tainted based on validating a signed token included in the token information associated with the first registration message. For example, in determining whether the first virtual machine (e.g., virtual desktop 812) is tainted, desktop delivery controller 831 and/or server computing device 830 may determine that the first virtual machine (e.g., virtual desktop 812) is not tainted based on validating a signed token included in the token information associated with the first registration message. For instance, desktop delivery controller 831 and/or server computing device 830 may validate the signed token included in the token information associated with the first registration message received from virtual desktop 812 using a corresponding public encryption key maintained by the relevant trusted authority. For example, the signed token included in the token information associated with the first registration message received from virtual desktop 812 may be a token that has been signed and/or encrypted using a private encryption key, and a recipient of the token may be able to validate the token using a public encryption key corresponding to the private encryption key.

In some instances, determining whether the first virtual machine is tainted may include determining that the first virtual machine is tainted based on failing to validate a signed token included in the token information associated with the first registration message. For example, in determining whether the first virtual machine (e.g., virtual desktop 812) is tainted, desktop delivery controller 831 and/or server computing device 830 may determine that the first virtual machine (e.g., virtual desktop 812) is tainted based on failing to validate a signed token included in the token information associated with the first registration message. For instance, desktop delivery controller 831 and/or server computing device 830 may attempt to validate a key included in the token information associated with the first registration message received from virtual desktop 812 using a corresponding public encryption key maintained by the relevant trusted authority, but such an attempt may fail and desktop delivery controller 831 and/or server computing device 830 thus may determine that virtual desktop 812 is tainted because the signed token included in the token information associated with the first registration message received from virtual desktop 812 is invalid.

In some instances, determining whether the first virtual machine is tainted may include determining that the first virtual machine is tainted based on determining that the token information associated with the first registration message does not include a signed token. For example, in determining whether the first virtual machine (e.g., virtual desktop 812) is tainted, desktop delivery controller 831 and/or server computing device 830 may determine that the first virtual machine (e.g., virtual desktop 812) is tainted based on determining that the token information associated with the first registration message does not include a signed token. For instance, desktop delivery controller 831 and/or server computing device 830 may determine that the token information associated with the first registration message received from virtual desktop 812 does not include a signed token (e.g., because virtual desktop 812 may have previously deleted its signed token), and desktop delivery controller 831 and/or server computing device 830 thus may determine that virtual desktop 812 is tainted.

In some embodiments, the token information associated with the first registration message may include a signed token associated with a disk image used to boot the first virtual machine. For example, the token information associated with the first registration message received by desktop delivery controller 831 and/or server computing device 830 from virtual desktop 812 may include a signed token associated with a disk image used to boot virtual desktop 812. In such arrangements, a signed token may, for example, be "baked" into and/or otherwise defined in the image from which a virtual machine (e.g., virtual desktop 812, virtual desktop 813) is created and/or booted.

In some embodiments, the token information associated with the first registration message may include a signed token provided to the first virtual machine by a second server computing device different from the server computing device during a provisioning process. For example, the token information associated with the first registration message received by desktop delivery controller 831 and/or server computing device 830 from virtual desktop 812 may include a signed token provided to the first virtual machine (e.g., virtual desktop 812) by a second server computing device (e.g., server computing device 820) different from the server computing device (e.g., server computing device 830) during a provisioning process. For instance, desktop delivery controller 821 and/or server computing device 820 may have provided one or more signed tokens to one or more virtual machines (e.g., virtual desktop 812, virtual desktop 813) at initial registration, as discussed above, and the one or more virtual machines (e.g., virtual desktop 812, virtual desktop 813) may present such signed tokens to desktop delivery controller 831 and/or server computing device 830 (e.g., since server computing device 820 has failed and the one or more virtual machines are registering with server computing device 830 as a result of the failure of server computing device 820).

At step 922, desktop delivery controller 831 and/or server computing device 830 may update one or more virtual machine state records. For example, at step 922, desktop delivery controller 831 and/or server computing device 830 may update virtual machine state information records maintained by the server computing device (e.g., server computing device 830) based on the state of the first virtual machine (e.g., virtual desktop 812) determined by the server computing device (e.g., server computing device 830). For instance, desktop delivery controller 831 and/or server computing device 830 may update virtual machine state information records maintained by server computing device 830 to indicate that virtual desktop 812 is tainted based on determining that virtual desktop 812 is tainted.

In one or more arrangements, the virtual machine state information records maintained by the server computing device (e.g., server computing device 830) may identify one or more tainted virtual machines and one or more untainted virtual machines. In addition, the server computing device (e.g., server computing device 830) may be configured to select virtual machines for brokered virtual desktop sessions based on the virtual machine state information records maintained by the server computing device (e.g., server computing device 830). For instance, desktop delivery controller 831 and/or server computing device 830 may be configured to select untainted and/or unused virtual machines for brokered virtual desktop sessions based on the virtual machine state information records maintained by server computing device 830 identifying untainted and/or unused virtual machines and/or records maintained by server computing device 830 identifying tainted and/or used virtual machines.

In some embodiments, updating the virtual machine state information records maintained by the server computing device may include updating the virtual machine state information records maintained by the server computing device to mark the first virtual machine as tainted based on determining that the first virtual machine is tainted. For example, in updating the virtual machine state information records maintained by the server computing device (e.g., server computing device 830) at step 922, desktop delivery controller 831 and/or server computing device 830 may update the virtual machine state information records maintained by the server computing device (e.g., server computing device 830) to mark the first virtual machine (e.g., virtual desktop 812) as tainted based on determining that the first virtual machine (e.g., virtual desktop 812) is tainted.

In some embodiments, updating the virtual machine state information records maintained by the server computing device may include updating the virtual machine state information records maintained by the server computing device to mark the first virtual machine as untainted based on determining that the first virtual machine is not tainted. For example, in updating the virtual machine state information records maintained by the server computing device (e.g., server computing device 830) at step 922, desktop delivery controller 831 and/or server computing device 830 may update the virtual machine state information records maintained by the server computing device (e.g., server computing device 830) to mark the first virtual machine (e.g., virtual desktop 812) as untainted based on determining that the first virtual machine (e.g., virtual desktop 812) is not tainted.

In some embodiments, a broker agent service executing on the first virtual machine may be configured to delete a signed token maintained by the first virtual machine in response to determining that the first virtual machine has been tainted. For example, a broker agent service executing on the first virtual machine (e.g., virtual desktop 812) may be configured to delete a signed token maintained by the first virtual machine (e.g., virtual desktop 812) in response to determining that the first virtual machine (e.g., virtual desktop 812) has been tainted. As discussed above, the signed token maintained by the first virtual machine (e.g., virtual desktop 812) may be received by the first virtual machine (e.g., virtual desktop 812) from a server computing device (e.g., server computing device 820) at initial registration or may be defined in a disk image from which the first virtual machine (e.g., virtual desktop 812) is created and/or booted.

In some embodiments, the broker agent service executing on the first virtual machine may be configured to determine that the first virtual machine has been tainted in response to receiving a prepare session message from a desktop delivery controller. For example, the broker agent service executing on the first virtual machine (e.g., virtual desktop 812) may be configured to determine that the first virtual machine (e.g., virtual desktop 812) has been tainted in response to receiving a prepare session message from a desktop delivery controller (which may, e.g., execute on and/or be provided by a server computing device, such as server computing device 820 or server computing device 830). In these arrangements, the broker agent service executing on the first virtual machine (e.g., virtual desktop 812) may be configured to delete a signed token maintained by the first virtual machine (e.g., virtual desktop 812) in response to receiving a prepare session message from server computing device 820, server computing device 830, or the like.

In some embodiments, the broker agent service executing on the first virtual machine may be configured to determine that the first virtual machine has been tainted in response to determining that the first virtual machine has initiated an unbrokered session. For example, the broker agent service executing on the first virtual machine (e.g., virtual desktop 812) may be configured to determine that the first virtual machine (e.g., virtual desktop 812) has been tainted in response to determining that the first virtual machine (e.g., virtual desktop 812) has initiated an unbrokered session. Such an unbrokered session may involve a user logging into the first virtual machine (e.g., virtual desktop 812) via a connection other than a brokered session provided by a server computing device (e.g., server computing device 820, server computing device 830). For example, an unbrokered session may result from a user logging into the first virtual machine (e.g., virtual desktop 812) while physically present at the first virtual machine (e.g., virtual desktop 812) and logging into the first virtual machine (e.g., virtual desktop 812) at its console, via a remote desktop protocol, and/or via other means. In these arrangements, the broker agent service executing on the first virtual machine (e.g., virtual desktop 812) may be configured to delete a signed token maintained by the first virtual machine (e.g., virtual desktop 812) in response to determining that the first virtual machine (e.g., virtual desktop 812) has initiated an unbrokered session.

In some instances, prior to sending the first registration message to the server computing device, the first virtual machine may have deleted a signed token maintained by the first virtual machine in response to receiving a prepare session message from a second server computing device different from the server computing device. For example, prior to sending the first registration message to the server computing device (e.g., server computing device 830), the first virtual machine (e.g., virtual desktop 812) may have deleted a signed token maintained by the first virtual machine (e.g., virtual desktop 812) in response to receiving a prepare session message from a second server computing device (e.g., server computing device 820) different from the server computing device (e.g., server computing device 830), as illustrated in the example event sequence illustrated in FIGS. 9A-9F. For instance, the first virtual machine (e.g., virtual desktop 812) may have deleted its signed token as a result of being previously connected to and/or used by user computing device 840.

In some embodiments, the first virtual machine may be configured to send the first registration message to the server computing device in response to detecting that a second server computing device has failed. For example, the first virtual machine (e.g., virtual desktop 812) may be configured to send the first registration message to the server computing device (e.g., server computing device 830) in response to detecting that a second server computing device (e.g., server computing device 820) has failed. The second virtual machine (e.g., virtual desktop 813) may be similarly configured to send a registration message to the server computing device (e.g., server computing device 830) in response to detecting that a second server computing device (e.g., server computing device 820) has failed. As discussed above, the one or more virtual machines (e.g., virtual desktop 812, virtual desktop 813) may detect that a second server computing device (e.g., server computing device 820) has failed, and thus may send one or more registration messages to the server computing device (e.g., server computing device 830), based on determining that the second server computing device (e.g., server computing device 820) is no longer responding, that one or more ping messages to and/or from the second server computing device (e.g., server computing device 820) have failed, that a connection to the second server computing device (e.g., server computing device 820) has been lost, and/or the like.

In some embodiments, the server computing device may be configured to execute a desktop delivery controller service that connects one or more user devices with one or more virtual machines executed on a virtualization platform. For example, the server computing device (e.g., server computing device 820, server computing device 830) may be configured to execute a desktop delivery controller service that connects one or more user devices (e.g., user computing device 840, user computing device 850) with one or more virtual machines (e.g., virtual desktop 812, virtual desktop 813) executed on a virtualization platform (e.g., virtualization platform 810).

Figure 9E:
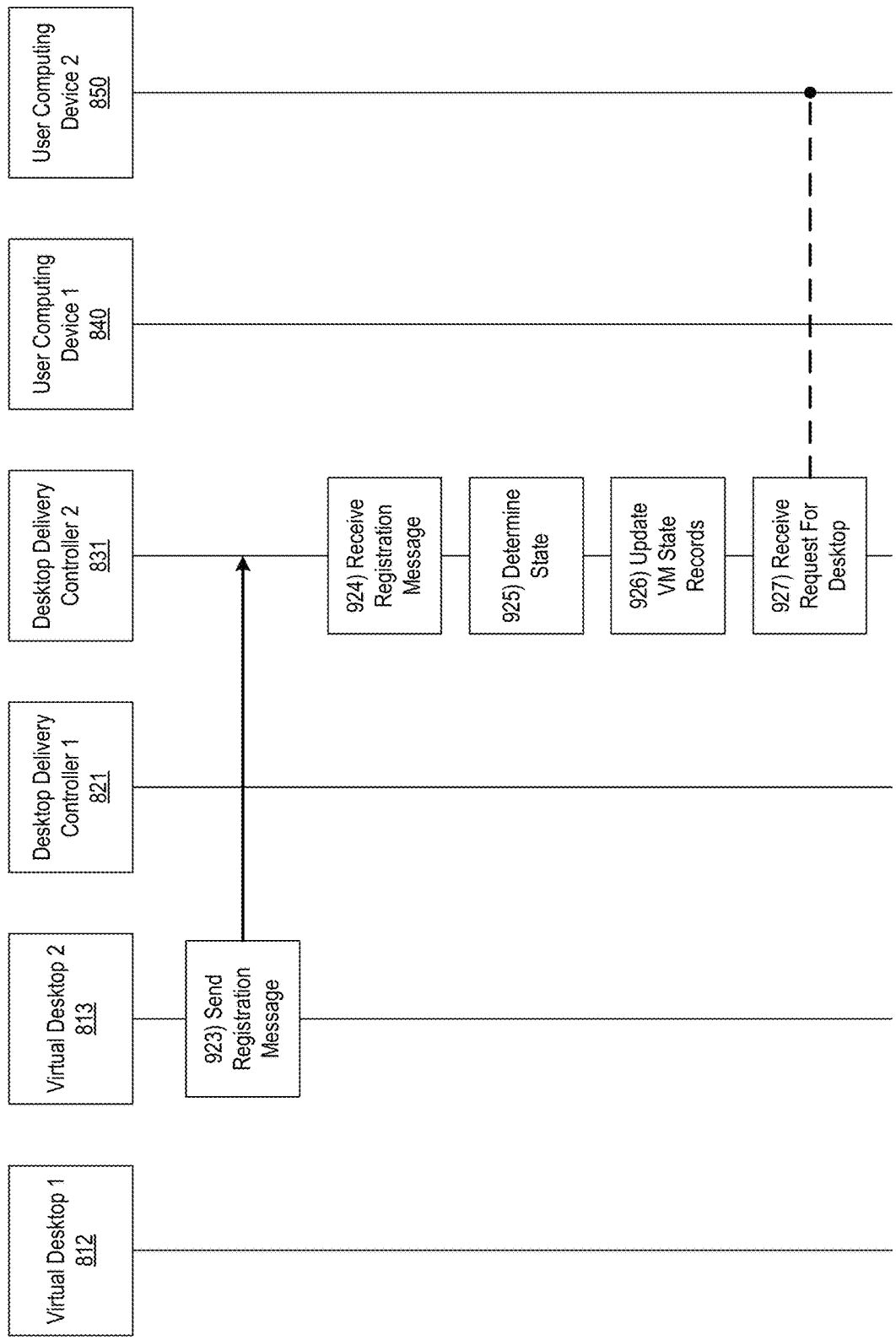

Referring to FIG. 9E, at step 923, virtual desktop 813 may send a registration message to desktop delivery controller 831 and/or server computing device 830. For example, virtual desktop 813 may send a registration message to desktop delivery controller 831 and/or server computing device 830 based on information identifying server computing device 830 as a redundant server and/or failover server for server computing device 820 (e.g., and based on detecting that server computing device 820 has failed at step 918). At step 924, desktop delivery controller 831 and/or server computing device 830 may receive the registration message from virtual desktop 813. For example, at step 924, desktop delivery controller 831 and/or server computing device 830 may receive, via the communication interface (e.g., communication interface 834), a second registration message from a second virtual machine (e.g., virtual desktop 813).

At step 925, desktop delivery controller 831 and/or server computing device 830 may determine the state of virtual desktop 813. For example, at step 925, desktop delivery controller 831 and/or server computing device 830 may determine a state of the second virtual machine (e.g., virtual desktop 813) based on second token information associated with the second registration message received from the second virtual machine (e.g., virtual desktop 813). For instance, desktop delivery controller 831 and/or server computing device 830 may determine that virtual desktop 813 is not tainted, since virtual desktop 813 might not have been used yet and virtual desktop 813 may still maintain its valid and signed token, and thus the second registration message received by desktop delivery controller 831 and/or server computing device 830 from virtual desktop 813 may include the valid and signed token.

At step 926, desktop delivery controller 831 and/or server computing device 830 may update one or more virtual machine state records. For example, at step 926, desktop delivery controller 831 and/or server computing device 830 may update the virtual machine state information records maintained by the server computing device (e.g., server computing device 830) based on the state of the second virtual machine (e.g., virtual desktop 813) determined by the server computing device (e.g., server computing device 830). For instance, desktop delivery controller 831 and/or server computing device 830 may update virtual machine state information records maintained by server computing device 830 to indicate that virtual desktop 813 is untainted based on determining that virtual desktop 813 is not tainted.

At step 927, desktop delivery controller 831 and/or server computing device 830 may receive a request for a virtual desktop from user computing device 850. For example, at step 927, desktop delivery controller 831 and/or server computing device 830 may receive, via the communication interface (e.g., communication interface 834), a request to connect to a virtual desktop from a user device (e.g., user computing device 850).

Referring to FIG. 9F, at step 928, desktop delivery controller 831 and/or server computing device 830 may select a virtual desktop based on one or more virtual machine state records. For example, at step 928, in response to receiving the request to connect to the virtual desktop from the user device (e.g., user computing device 850), desktop delivery controller 831 and/or server computing device 830 may select an untainted virtual machine based on the virtual machine state information records maintained by the server computing device (e.g., server computing device 830). For instance, desktop delivery controller 831 and/or server computing device 830 may select virtual desktop 813 for a brokered virtual desktop session with user computing device 850 based on the virtual machine state information records maintained by server computing device 830 identifying virtual desktop 813 as an untainted virtual machine.

At step 929, desktop delivery controller 831 and/or server computing device 830 may send a prepare session message to virtual desktop 813 (e.g., based on selecting virtual desktop 813 at step 928). For example, at step 929, desktop delivery controller 831 and/or server computing device 830 may initiate a brokered virtual desktop session between the user device (e.g., user computing device 850) and the untainted virtual machine (e.g., virtual desktop 813). In initiating the brokered virtual desktop session between the user device (e.g., user computing device 850) and the untainted virtual machine (e.g., virtual desktop 813), desktop delivery controller 831 and/or server computing device 830 may send a prepare session message to the untainted virtual machine (e.g., virtual desktop 813). In addition, after sending the prepare session message to the untainted virtual machine (e.g., virtual desktop 813), desktop delivery controller 831 and/or server computing device 830 may connect the user device (e.g., user computing device 850) to the untainted virtual machine (e.g., virtual desktop 813), as illustrated in greater detail below.

In some embodiments, the untainted virtual machine may be configured to delete a signed token maintained on the untainted virtual machine in response to receiving the prepare session message. For example, the untainted virtual machine (e.g., virtual desktop 813) may be configured to delete a signed token maintained on the untainted virtual machine (e.g., virtual desktop 813) in response to receiving the prepare session message (e.g., from desktop delivery controller 831 and/or server computing device 830, at step 929).

At step 930, virtual desktop 813 may delete its signed token. For example, at step 930, virtual desktop 813 may delete a signed token maintained by virtual desktop 813 in response to receiving the prepare session message from desktop delivery controller 831 and/or server computing device 830. At step 931, desktop delivery controller 831 and/or server computing device 830 may update one or more virtual machine state records. For example, at step 931, desktop delivery controller 831 and/or server computing device 830 may update one or more virtual machine state records to indicate that user computing device 850 is being and/or has connected to virtual desktop 813 and/or to indicate that virtual desktop 813 has been tainted (e.g., because virtual desktop 813 is being and/or has been connected to and/or used by user computing device 850). At step 932, user computing device 850 may connect to virtual desktop 813. Desktop delivery controller 831 and/or server computing device 830 may, for example, update one or more virtual machine state records to indicate that user computing device 850 is being and/or has connected to virtual desktop 813 and/or to indicate that virtual desktop 813 has been tainted before allowing user computing device 850 and/or a user of user computing device 850 to connect to virtual desktop 813 to prevent multiple users from accessing virtual desktop 813 and/or to otherwise improve security (e.g., in instances in which desktop delivery controller 831 and/or server computing device 830 is simultaneously processing multiple requests, for instance, from multiple users and/or devices).

In some instances, based on and/or in response to identifying one or more virtual machines as tainted, a server computing device (e.g., server computing device 820, server computing device 830) may clean the one or more virtual machines identified as tainted. For example, the server computing device (e.g., server computing device 820, server computing device 830) may clean the one or more virtual machines identified as tainted by sending one or more messages to a hypervisor (e.g., hypervisor 811) associated with a virtualization platform (e.g., virtualization platform 810) providing the one or more virtual machines (e.g., virtual desktop 812, virtual desktop 813) to power cycle the one or more virtual machines (e.g., virtual desktop 812, virtual desktop 813), which may return the one or more virtual machines (e.g., virtual desktop 812, virtual desktop 813) to the original and/or untainted state. In some instances, after sending one or more messages to the hypervisor (e.g., hypervisor 811) associated with the virtualization platform (e.g., virtualization platform 810) providing the one or more virtual machines (e.g., virtual desktop 812, virtual desktop 813) to power cycle the one or more virtual machines (e.g., virtual desktop 812, virtual desktop 813), the server computing device (e.g., server computing device 820, server computing device 830) also may provide the one or more virtual machines (e.g., virtual desktop 812, virtual desktop 813) that were power cycled with one or more signed tokens. For instance, the server computing device (e.g., server computing device 820, server computing device 830) may provide the one or more virtual machines (e.g., virtual desktop 812, virtual desktop 813) that were power cycled with one or more signed and/or encrypted tokens to be presented as signed tokens in instances in which a signed token is not included in the disk image from which the one or more virtual machines (e.g., virtual desktop 812, virtual desktop 813) are created and/or booted.

In some arrangements, multiple trusted authorities may generate the signed tokens for the one or more virtual machines (e.g., virtual desktop 812, virtual desktop 813). In such arrangements, the multiple trusted authorities may share a single public/private key pair in some instances, while in other instances, each trusted authority of the multiple trusted authorities may have its own unique public/private key pair. Additionally or alternatively, the one or more public/private key pairs used by the one or more trusted authorities may be periodically rotated to provide additional security.

In some arrangements, the signed tokens used by the one or more virtual machines (e.g., virtual desktop 812, virtual desktop 813) may contain machine identifiers, sequence numbers, and/or timestamps. Such information may, for instance, minimize potential impacts if a signed token is ever compromised. Additionally or alternatively, aspects of the disclosure may be implemented across many and/or all different types of VDI deployments and might not be limited to use with a specific hypervisor. In this way, aspects of the disclosure may enable VDI desktops to be transitioned to a different broker for high availability, without necessarily needing to share state information between to the two brokers, and thereby rendering the overall system more fault tolerant.

Figure 10:
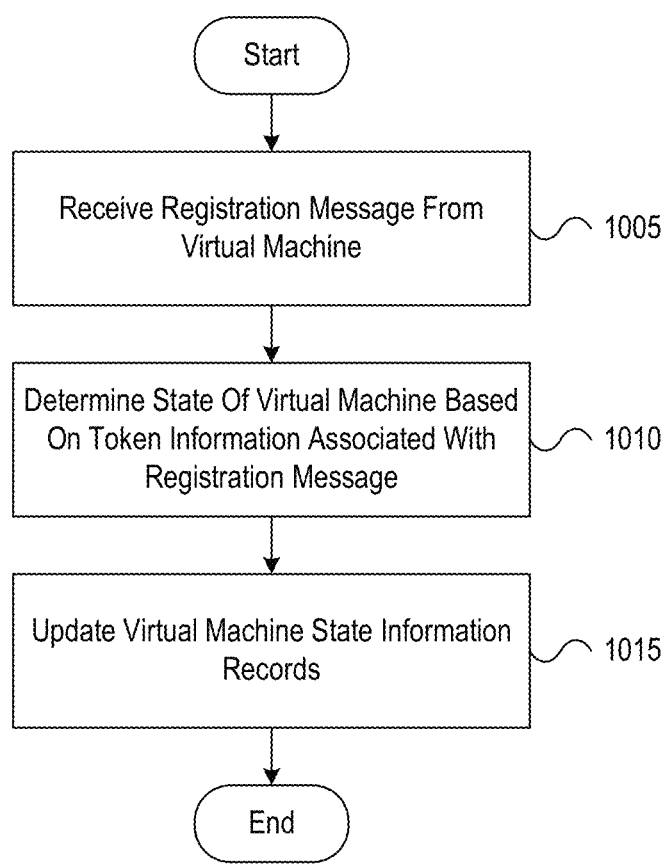
FIG. 10 depicts an example method of tracking and managing virtual desktops using signed tokens in accordance with one or more illustrative aspects described herein.

FIG. 10 depicts an example method of tracking and managing virtual desktops using signed tokens in accordance with one or more illustrative aspects described herein. Referring to FIG. 10, at step 1005, a server computing device having at least one processor, a communication interface, and a memory may receive, via the communication interface, a first registration message from a first virtual machine. At step 1010, the server computing device may determine a state of the first virtual machine based on token information associated with the first registration message received from the first virtual machine. At step 1015, the server computing device may update virtual machine state information records maintained by the server computing device based on the state of the first virtual machine determined by the server computing device. The virtual machine state information records maintained by the server computing device may identify one or more tainted virtual machines and one or more untainted virtual machines. In addition, the server computing device may be configured to select virtual machines for brokered virtual desktop sessions based on the virtual machine state information records maintained by the server computing device.

As illustrated above, various aspects of the disclosure relate to tracking and managing virtual desktops using signed tokens. Although the subject matter has been described in language specific to structural features and/or methodological acts, it is to be understood that the subject matter defined in the appended claims is not necessarily limited to the specific features or acts described above. Rather, the specific features and acts described above are described as some example implementations of the following claims.

What is claimed is:

1. A method comprising:
   receiving, by a server computing device comprising at least one processor and a communication interface, via the communication interface, a first registration message from a first virtual machine;
   determining, by the server computing device, a state of the first virtual machine based on token information associated with the first registration message received from the first virtual machine; and
   updating, by the server computing device, virtual machine state information records maintained by the server computing device based on the state of the first virtual machine determined by the server computing device,
   wherein the virtual machine state information records maintained by the server computing device identify one or more tainted virtual machines and one or more untainted virtual machines,
   wherein the server computing device is configured to select virtual machines for brokered virtual desktop sessions based on the virtual machine state information records maintained by the server computing device, and
   wherein a broker agent service executing on the first virtual machine is configured to delete a signed token maintained by the first virtual machine in response to determining that the first virtual machine has been tainted.

2. The method of claim 1, wherein determining the state of the first virtual machine based on the token information associated with the first registration message received from the first virtual machine comprises determining whether the first virtual machine is tainted.

3. The method of claim 2, wherein determining whether the first virtual machine is tainted comprises:
   determining that the first virtual machine is not tainted based on validating a signed token included in the token information associated with the first registration message.

4. The method of claim 2, wherein determining whether the first virtual machine is tainted comprises:
   determining that the first virtual machine is tainted based on failing to validate a signed token included in the token information associated with the first registration message.

5. The method of claim 2, wherein determining whether the first virtual machine is tainted comprises:
   determining that the first virtual machine is tainted based on determining that the token information associated with the first registration message does not include a signed token.

6. The method of claim 2, wherein updating the virtual machine state information records maintained by the server computing device comprises updating the virtual machine state information records maintained by the server computing device to mark the first virtual machine as tainted based on determining that the first virtual machine is tainted.

7. The method of claim 2, wherein updating the virtual machine state information records maintained by the server computing device comprises updating the virtual machine state information records maintained by the server computing device to mark the first virtual machine as untainted based on determining that the first virtual machine is not tainted.

8. The method of claim 1, comprising:
   receiving, by the server computing device, via the communication interface, a second registration message from a second virtual machine;
   determining, by the server computing device, a state of the second virtual machine based on second token information associated with the second registration message received from the second virtual machine; and
   updating, by the server computing device, the virtual machine state information records maintained by the server computing device based on the state of the second virtual machine determined by the server computing device.

9. The method of claim 1, wherein the token information associated with the first registration message comprises a signed token associated with a disk image used to boot the first virtual machine.

10. The method of claim 1, wherein the token information associated with the first registration message comprises a signed token provided to the first virtual machine by a second server computing device different from the server computing device during a provisioning process.

11. The method of claim 1, wherein the broker agent service executing on the first virtual machine is configured to determine that the first virtual machine has been tainted in response to receiving a prepare session message from a desktop delivery controller.

12. The method of claim 1, wherein the broker agent service executing on the first virtual machine is configured to determine that the first virtual machine has been tainted in response to determining that the first virtual machine has initiated an unbrokered session.

13. The method of claim 1, wherein prior to sending the first registration message to the server computing device, the first virtual machine deleted the signed token maintained by the first virtual machine in response to receiving a prepare session message from a second server computing device different from the server computing device.

14. The method of claim 1, wherein the first virtual machine is configured to send the first registration message to the server computing device in response to detecting that a second server computing device has failed.

15. The method of claim 1, wherein the server computing device is configured to execute a desktop delivery controller service that connects one or more user devices with one or more virtual machines executed on a virtualization platform.

16. The method of claim 1, comprising:
receiving, by the server computing device, via the communication interface, a request to connect to a virtual desktop from a user device;
in response to receiving the request to connect to the virtual desktop from the user device, selecting, by the server computing device, an untainted virtual machine based on the virtual machine state information records maintained by the server computing device; and
initiating, by the server computing device, a brokered virtual desktop session between the user device and the untainted virtual machine, wherein initiating the brokered virtual desktop session between the user device and the untainted virtual machine comprises:
sending a prepare session message to the untainted virtual machine; and
after sending the prepare session message to the untainted virtual machine, connecting the user device to the untainted virtual machine.

17. The method of claim 16, wherein the untainted virtual machine is configured to delete a signed token maintained on the untainted virtual machine in response to receiving the prepare session message.

18. A server computing device comprising:
at least one processor;
a communication interface; and
a memory storing instructions that, when executed by the at least one processor, cause the server computing device to:
receive, via the communication interface, a first registration message from a first virtual machine;
determine a state of the first virtual machine based on token information associated with the first registration message received from the first virtual machine; and
update virtual machine state information records maintained by the server computing device based on the state of the first virtual machine determined by the server computing device,
wherein the virtual machine state information records maintained by the server computing device identify one or more tainted virtual machines and one or more untainted virtual machines,
wherein the server computing device is configured to select virtual machines for brokered virtual desktop sessions based on the virtual machine state information records maintained by the server computing device, and
wherein a broker agent service executing on the first virtual machine is configured to delete a signed token maintained by the first virtual machine in response to determining that the first virtual machine has been tainted.

19. The server computing device of claim 18, wherein the broker agent service executing on the first virtual machine is configured to determine that the first virtual machine has been tainted in response to receiving a prepare session message from a desktop delivery controller.

20. One or more non-transitory computer-readable media storing instructions that, when executed by a server computing device comprising at least one processor and a communication interface, cause the server computing device to:
receive, via the communication interface, a first registration message from a first virtual machine;
determine a state of the first virtual machine based on token information associated with the first registration message received from the first virtual machine; and
update virtual machine state information records maintained by the server computing device based on the state of the first virtual machine determined by the server computing device,
wherein the virtual machine state information records maintained by the server computing device identify one or more tainted virtual machines and one or more untainted virtual machines,
wherein the server computing device is configured to select virtual machines for brokered virtual desktop sessions based on the virtual machine state information records maintained by the server computing device, and
wherein a broker agent service executing on the first virtual machine is configured to delete a signed token maintained by the first virtual machine in response to determining that the first virtual machine has been tainted.

* * * * *